(12) United States Patent
Muramatsu et al.

(10) Patent No.: US 6,515,213 B2
(45) Date of Patent: Feb. 4, 2003

(54) KEYBOARD MUSICAL INSTRUMENT FOR EXACTLY PRODUCING TONES AND HAMMER SENSOR VARYING OUTPUT SIGNAL EXACTLY REPRESENTING PHYSICAL QUANTITY OF HAMMER

(75) Inventors: Shigeru Muramatsu, Shizuoka (JP); Tsutomu Sasaki, Shizuoka (JP); Tadaharu Kato, Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/002,262

(22) Filed: Nov. 14, 2001

(65) Prior Publication Data

US 2002/0059862 A1 May 23, 2002

(30) Foreign Application Priority Data

Nov. 17, 2000 (JP) ........................................ 2000-351192

(51) Int. Cl.[7] ................................................. G10F 1/02
(52) U.S. Cl. ........................ 84/687; 84/236; 84/423 R; 84/600; 84/719
(58) Field of Search .............................. 84/2–3, 19–23, 84/171, 236–255, 423 R, 433, 600, 615, 626, 633, 658, 665, 687–690, 719

(56) References Cited

U.S. PATENT DOCUMENTS

| | | | |
|---|---|---|---|
| 5,237,123 A | | 8/1993 | Miller |
| 5,612,502 A | * | 3/1997 | Ura ................................ 84/171 |
| 5,880,393 A | * | 3/1999 | Kaneko et al. ................. 84/21 |
| 6,359,207 B1 | * | 3/2002 | Oba et al. ........................ 84/20 |
| 6,380,472 B1 | * | 4/2002 | Sugiyama et al. ........ 84/470 R |
| 6,384,305 B1 | * | 5/2002 | Lee ................................. 84/21 |
| 6,403,872 B2 | * | 6/2002 | Muramatsu et al. ............ 84/21 |

FOREIGN PATENT DOCUMENTS

| | | |
|---|---|---|
| JP | 6-138870 | 5/1994 |
| JP | 6-149233 | 5/1994 |

* cited by examiner

*Primary Examiner*—Marlon T. Fletcher
(74) *Attorney, Agent, or Firm*—Morrison & Foerster LLP

(57) ABSTRACT

A hammer sensor includes a photo-filter plate movable together with a hammer assembly and having a base plate fixed to the hammer shank and an arc pattern formed on the base plate and different in transparency from the base plate, a photo radiating element radiating a light beam toward the arc pattern and a photo detecting element disposed on the optical path of the light beam for converting the amount of transmitted light to an electric signal, wherein the photo-filter plate converts the rotational angle of the hammer assembly to the amount of light incident on the photo detecting element, and makes the photo radiating element and the photo detecting element stationary so that a suitable photo-shield case prevents the photo elements from environmental light.

11 Claims, 16 Drawing Sheets

KEYBOARD MUSICAL INSTRUMENT FOR EXACTLY PRODUCING TONES AND HAMMER SENSOR VARYING OUTPUT SIGNAL EXACTLY REPRESENTING PHYSICAL QUANTITY OF HAMMER

FIELD OF THE INVENTION

This invention relates to a keyboard musical instrument and, more particularly, to a keyboard musical instrument equipped with hammers such as, for example, an automatic player piano and a silent piano and a hammer sensor used therein.

DESCRIPTION OF THE RELATED ART

The automatic player piano is a composite keyboard musical instrument fabricated on the basis of an acoustic piano. An array of solenoid-operated key actuators and an array of key sensors are provided in association with the keyboard, and an electronic controlling system is connected to the array of solenoid-operated key actuators and the array of key sensors. While a pianist is playing a tune on the keyboard, the black and white keys are selectively depressed by the pianist, and the associated key sensors report the key motion to the electronic controlling system. The electronic controlling system specifies the depressed black/white keys and the released black/white keys, and determines the lapse of time at which the black/white keys are depressed and released. Moreover, the electronic controlling system calculates the key velocity. These pieces of music data information are stored in a set of music data codes for playback.

When a user instructs the electronic controlling system to reproduce the performance, the electronic controlling system reads out the pieces of music data information. The electronic controlling system supplies driving signals to the solenoid-operated key actuators at the same timing as in the original performance, and the solenoid-operated key actuators move the associated black/white keys without any fingering on the keyboard. Thus, the automatic player piano records the original performance, and reproduces the original performance without any fingering on the keyboard.

The silent piano is another composite keyboard musical instrument. An array of key sensors is provided in association with the keyboard, and an electronic tone generating system is connected to the array of key sensors. A hammer stopper is changeable between a free position and a blocking position. When the hammer stopper is changed to the free position, the hammer stopper is moved out of the trajectories of the hammers. The pianist selectively strikes the music strings with the hammers through the fingering on the keyboard, and the acoustic piano tones are generated from the vibrating music strings. If the pianist changes the hammer stopper to the blocking position, the hammer stopper is moved into the trajectories of the hammers. Even though the pianist fingers a tune on the keyboard, the hammers rebound on the hammer stopper before striking the music strings, and any acoustic piano tone is not generated from the music strings. However, the key sensors monitor the associated black/white keys, and report the key motion to the electronic tone generating system. The electronic tone generating system specifies the depressed black/white keys and the released black/white keys, and determines the key velocity. The electronic tone generating system produces an electric signal representative of the tones to be generated, and electronic tones are produced by a sound system.

Thus, the key sensors are indispensable in both automatic player and silent pianos. When a pianist simply depresses the black/white keys from the rest positions to the end positions, the key sensors exactly report the key motion to the electronic controlling/electronic tone generating system, and the reproduced tone/electronic tone is fairly equivalent to the original tone, because the associated hammer is driven for rotation at a hammer velocity proportional to the key velocity. However, the performance is usually not constituted by the simple key motion. A black/white key may be repeatedly depressed by the pianist, and another black/white key may return on the way to the end position. In this situation, the key motion does not give rise to the hammer motion at a hammer velocity proportional to the key motion. As a result, the reproduced tone/electronic tone is generated at loudness different from the original piano tone/the piano tone to be generated. Thus, the key sensors hardly respond to the complicated key motion.

In order to exactly determine the hammer motion, it has been proposed directly to detect the hammer motion. An array of hammer sensors is installed inside the piano case. The hammer sensors directly monitor the associated hammers, and report the current positions of the associated hammers. With the pieces of positional information, the electronic controlling system/electronic tone generating system exactly determines the hammer motion, and stores the pieces of music data information in the music data codes.

There are several kinds of hammer sensors which have been already known. The first kind of hammer sensor is a combination of a shutter plate and a photo-coupler. The shutter plate is formed with a window. Otherwise, the photo-coupler produces plural light beams. The shutter plate is assumed to have the window. The shutter plate is fixed to the hammer shank, and, accordingly, is movable together with the hammer assembly. The photo-coupler is, by way of example, supported by the action brackets, and produces the light beam across the trajectory of the shutter plate. When the associated black and white key is depressed, the action mechanism drives the hammer assembly for rotation, and the shutter plate is moved along the trajectory. When the shutter plate reaches the light beam, the shutter plate intercepts the light beam. The shutter plate continuously intercepting the light beam until the window reaches. The shutter plate permits the light beam to pass the window, and intercepts the light beam, again. The electronic controlling system/electronic tone generating system calculates the hammer velocity on the basis of the lapse of time between the interception at the front and the passage through the window. The shutter plate is appropriately designed so that the electronic controlling system/electronic tone generating system determines the timing at which the hammer strikes the string.

The second kind of the hammer sensor is shown in FIG. 1, and is a combination of a reflecting photo-coupler 500 and a reflecting sheet 502. The reflecting photo-coupler 500 is fixed to a stationary bracket 500, and radiates a light beam toward a hammer assembly 503. On the other hand, the reflecting sheet 502 is attached to the hammer shank 504, and is moved together with hammer assembly 503 along the trajectory of the hammer shank 504. The light beam is always reflected on the reflecting sheet 502, and returns to the reflecting photo-coupler 500. The amount of reflected light is varied depending upon the current hammer position, and the reflecting photo-coupler 500 reports the amount of reflected light to the electronic controlling system/electronic tone generating system. The electronic controlling system/ electronic tone generating system determines the current hammer position, and calculates the hammer velocity. The electronic controlling system/electronic tone generating system determines the time at which the hammer strikes the music string 505 when the amount of reflected light reaches a predetermined value.

The third kind of hammer sensor is a combination of a Hall-effect element and a permanent magnet piece. The reflecting photo-coupler 500 is replaced with the Hall-effect element, and the piece of permanent magnet piece is attached to the hammer shank 504. The magnetic field strength is varied together with the distance between the Hall-effect element and the permanent magnet piece, and the Hall-effect element generates the electric current in the magnetic field created by the permanent magnetic piece. The amount of current is representative of the magnetic field strength and, accordingly, the distance between the Hall-effect element and the permanent magnetic piece. The electronic controlling system/electronic tone generating system determines the current hammer position on the basis of the amount of electric current, and calculates the hammer velocity. When the amount of electric current reaches a predetermined value, the electronic controlling system/electronic tone generating system decides that the time to strike the music string comes. Thus, these kinds of hammer sensors cooperate with the electronic controlling system/electronic tone generating system, and assist the electronic controlling system/electronic tone generating system in the recording and generating the pieces of music data information representative of the performance on the keyboard. However, the following problems are encountered in those kinds of hammer sensors.

A problem inherent in the first kind of the hammer sensor is that the array of hammer sensors is liable to be deviated from the appropriate position. The electronic controlling system/electronic tone generating system decides the time to strike the music string on the basis of the timing at which the light beam passes the window, again. This means that the electronic controlling system/electronic tone generating system decides the time to strike the music string on the assumption that the photo-coupler and the shutter plate are appropriately positioned at the target points. If the photo-coupler or the shutter plate is deviated from the target position, the electronic controlling system/electronic tone generating system can not exactly decides the time to strike the music string. Careful work is required for the first kind of hammer sensor, and the tuning work is periodically to be done.

Another problem inherent in the first kind of hammer sensor is the narrow detectable range. The detectable range is equivalent to the distance between the front of the shutter plate and the window formed therein, and the trajectory of the hammer assembly is much longer than the detectable range. However, the photo-coupler does not change the amount of photo-current outside the detectable range. The electronic controlling system/electronic tone generating system can not obtain any piece of positional information outside the detectable range.

A problem inherent in the second kind of hammer sensor is serious noise component riding on the electric signal representative of the current hammer position. If the second kind of hammer sensor was installed in the ideal environment where the background illuminance was constant, the second kind of hammer sensor would generate the electric signal exactly representative of the current hammer position. However, the natural light and/or room light is incident on the photo-coupler. Unfortunately, the intensity of the natural light/room light is variable depending upon the season and the position of the composite keyboard musical instrument. This means that the manufacturer can not predict the background illuminance. For this reason, the noise component is serious, and makes the electronic controlling system/electronic tone generating system mistakenly decide the current hammer position and the time to strike the music string.

A problem inherent in the third kind of hammer sensor is also serious noise component. This is because of the fact that the Hall-effect element is placed in the magnetic field created by the adjacent permanent magnetic pieces as well as in the magnetic field created by the associated permanent magnetic piece. The hammer assemblies are independently driven for rotation, and the magnetic field strength at each Hall-effect element is varied together with not only the current hammer position of the associated hammer assembly but also the current hammer positions of the adjacent hammer assemblies. The magnetic influence of the adjacent permanent magnetic pieces is causative of the noise component.

Still another problem inherent in the second and third kinds of hammer sensors is an error component due to an approximation. The output voltage of the photo-coupler/Hall-effect element is varied from the rest position to the end position as indicated by non-linear plots PL1 (see FIG. 2A). The electronic controlling system/electronic tone generating system approximates the non-linear plots PL1 to linear plots PL2 (see FIG. 2B), and determines the current hammer position on the basis of the linear plots PL2. The difference between the non-linear plots PL1 and the linear plots PL2 is introduced into the pieces of positional data information. The electronic controlling system/electronic tone generating system produces the pieces of music data information on the basis of the pieces of positional data information, and the error component is left in the pieces of music data information.

SUMMARY OF THE INVENTION

It is therefore an important object of the present invention to provide a keyboard musical instrument, which exactly produces tones.

It is also an important object of the present invention to provide a hammer sensor, which has a wide detectable range and good reliability in producing an output signal exactly representing current hammer position.

In accordance with one aspect of the present invention, there is provided a keyboard musical instrument for producing tones comprising plural keys independently movable between respective rest positions to respective end positions, plural action mechanisms respectively connected to the plural keys so that moving keys actuate the associated action mechanisms, plural hammers respectively associated with the plural action mechanisms, and driven for rotation by the associated action mechanisms, and a music data generating system including plural hammer sensors respectively monitoring the plural hammers for detecting a physical quantity of the plural hammers respectively rotatable on virtual planes with respect to a member, each of the plural hammer sensors having a photo radiating element stationary with respect to the member and radiating a light beam along an optical path at least a part of which extends in a direction crossing the virtual plane of the associated hammer, a photo receiving element stationary with respect to the member and provided on the optical path for producing a hammer signal representative of the amount of incident light and a converter rotatable together with the associated hammer and radiated with the light beam for converting a variation of the physical quantity to a variation of the amount of incident light and a data processing sub-system connected to the plural hammer sensors for receiving the hammer signals and analyzing a hammer motion represented by the variation of the amount of incident light for each of the plural hammers so as to produce an audio signal representative of the tone to be produced through the hammer motion.

In accordance with another aspect of the present invention, there is provided a hammer sensor for detecting a physical quantity of a hammer rotatable on a virtual plane with respect to a member comprising a photo radiating element stationary with respect to the member and radiating a light beam along an optical path at least a part of which extends in a direction crossing the virtual plane, a photo receiving element stationary with respect to the member and provided on the optical path for producing an electric signal representative of the amount of an incident light, and a converter rotatable together with the hammer, and radiated with the light beam for converting a variation of the physical quantity to a variation of the amount of incident light.

BRIEF DESCRIPTION OF THE DRAWINGS

The features and advantages of the keyboard musical instrument and the hammer sensor will be more clearly understood from the following description taken in conjunction with the accompanying drawings in which.

DESCRIPTION OF THE PREFERRED EMBODIMENTS

First Embodiment
Keyboard Musical Instrument

Figure 3:
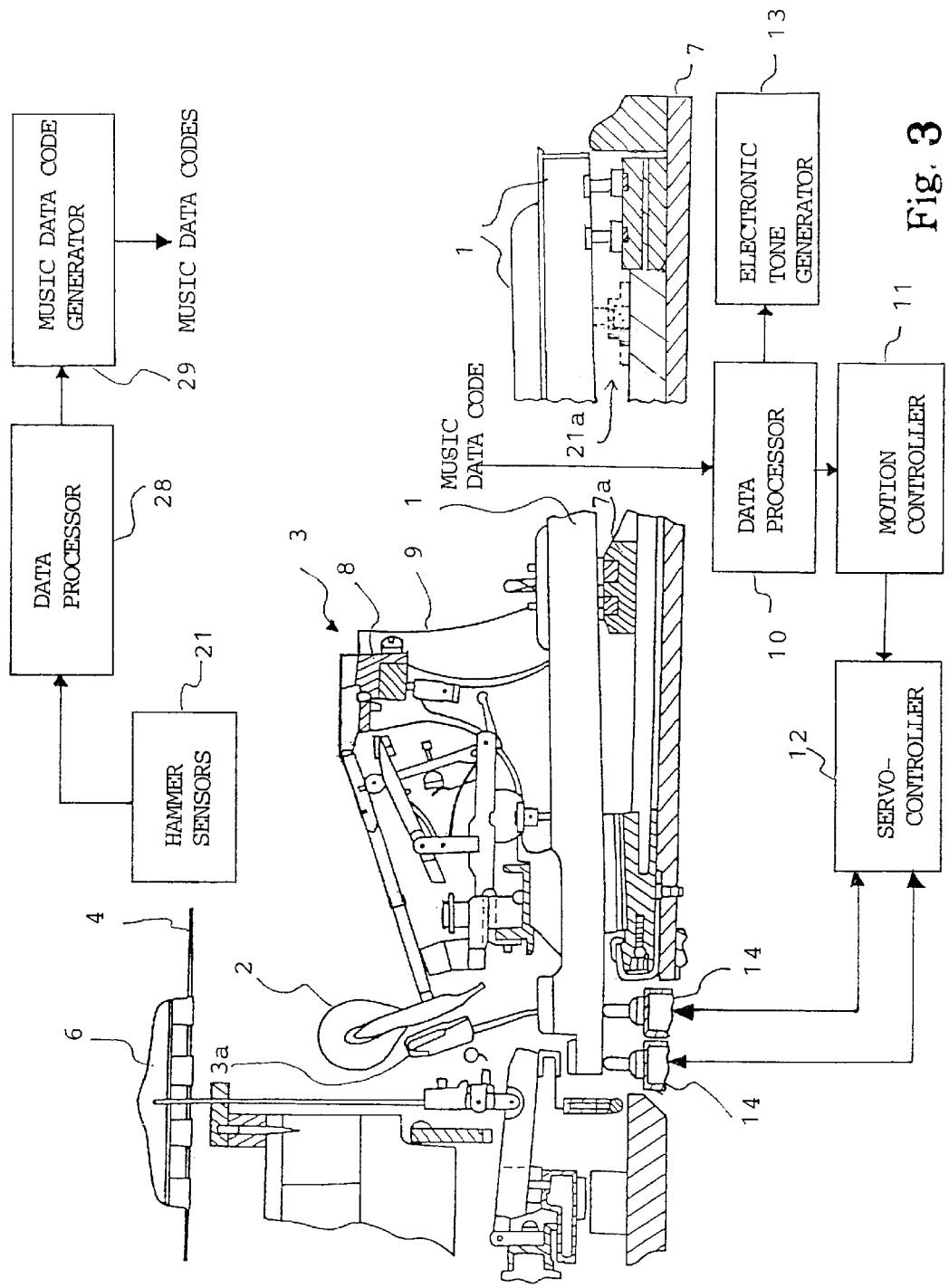
FIG. 3 is a schematic view showing an automatic player piano according to the present invention.

Referring to FIG. 3 of the drawings, an automatic player piano embodying the present invention largely comprises an acoustic piano and an electronic controlling system. In this instance, a grand piano is used as the acoustic piano. However, an upright piano is available for the automatic player piano. In the following description, word "front" is indicative of a position closer to a pianist who sits on a chair for playing the acoustic piano than "rear" position. Word "fore-and-aft" is indicative of a direction in parallel to a line between a front position and a corresponding rear position, and the "lateral" direction is perpendicular to the fore-and-aft direction.

The acoustic piano includes a keyboard or an array of black and white keys 1, hammer assemblies 2, action mechanisms 3, plural sets of strings 4 and dampers 6. The black and white keys 1 are laid on the well-known pattern, and are arranged on a key bed 7 in the lateral direction. When a pianist depresses the front portion of each black/white key 1, the front portion is sunk, and the black/white key 1 is rotated around a balance rail 7a.

The hammer assemblies 2 are respectively associated with the black/white keys 1, and are also arranged in the lateral direction. Plural action brackets 9 are placed over the key bed 7 at intervals, and the hammer assemblies 2 are rotatably supported through a shank flange rail 8 the action brackets 9. The action mechanisms 3 are also supported by the action brackets 9, and are provided between the black/white keys 1 and the hammer assemblies 2. The downward motion of the black/white key 1 gives rise to actuation of the associated action mechanism 3 so as to drive the associated hammer assembly 2 for rotation through escape from the action mechanism 3.

The sets of music strings 4 are assigned the notes of a scale, and are associated with the hammer assemblies 2 and, accordingly, the black/white keys 1. While the black/white key 1 is staying at the rest position, the hammer assemblies 2 are spaced from the associated sets of strings 4. The hammer assembly 2 starts the free rotation after the escape from the associated action mechanism 3, and strikes the associated set of strings 4. Then, the set of strings 4 vibrates for producing the tone. On the other hand, the hammer assembly 2 rebounds on the set of strings 4, and returns toward the rest position. The hammer assembly 2 is gently received by a back check 3a, and reaches the rest position after release of the depressed black/white key 1.

The dampers 6 are respectively provided for the sets of strings 4. Each of the dampers 6 is spaced from the associated set of string 4 by means of the depressed black/white key 1, and is brought into contact with the set of strings 4 after the release of the black/white key 1. When the damper 6 is spaced from the set of strings 4, the set of strings 4 is permitted to vibrate. However, while the damper 6 is resting on the associated set of strings 4, the set of strings 4 can not vibrate.

The electronic controlling system is broken down into two sub-systems. One of the sub-systems is used in playback, and is hereinbelow referred to as "automatic playing sub-system". The other sub-system produces music data codes representative of a performance on the keyboard, and is hereinbelow referred to as "music data generating sub-system".

The automatic playing subsystem is connected to a recorder or communication system, and music data codes are supplied to the automatic playing subsystem for selectively rotating the black/white keys 1 without fingering. The automatic playing subsystem includes a data processor 10, a motion controller 11, a servo-controller 12, an electronic tone generator 13 and an array of solenoid-operated key actuators 14. The solenoid-operated key actuators 14 are respectively provided under the rear portions of the black/white keys 1, and are equipped with built-in velocity sensors. The music data codes are successively supplied to the data processor 10, and the data processor 10 instructs the motion controller 11 to project and retract the plungers of the solenoid-operated key actuators 14 through the servo-controller 12. When a driving signal is supplied from the servo-controller 12 to a solenoid-operated key actuator, the solenoid-operated key actuator 14 upwardly projects the plunger from the solenoid, and the built-in velocity sensor supplies a feed-back signal to the servo-controller 12 for reporting the current plunger velocity.

In detail, the music data codes are classified to two categories. The music data codes in the first category store music data information representative of a kind of event such as a note-on event/note-off event, the key code representative of the black/white key 1 to be rotated, the velocity, i.e., the loudness of the tone to be generated and so forth. The music data codes in the second category store control data information representative of a lapse of time from the initiation of a performance at which the event occurs.

Assuming now that a music data code indicates the time at which the associated note-on event is to occur, the data processor 10 specifies one of the black/white keys 1 to be rotated on the basis of the key code, and determines a trajectory for the black/white key 1. The data processor 10 informs the motion controller 11 of the time t to start the rotation and the initial velocity Vr, i.e., coordinate (t, Vr). The motion controller 11 determines a series of coordinates on the trajectory, and sequentially supplies the target velocity to the servo-controller 12. The servo-controller 12 determines the magnitude of the driving signal, and supplies the driving signal to the associated solenoid operated key actuator 14. With the driving signal, the solenoid creates the magnetic field, and upwardly projects the plunger. The plunger pushes the rear portion of the associated black/white key 1. The black/white key 1 thus pushed by the plunger spaces the damper 6 from the set of strings 4, and gives rise to the rotation of the black/white key 1 around the balance rail 7a. The black/white key 1 actuates the action mechanism 3, and the hammer 2 is driven for the free rotation through the escape. The hammer 2 strikes the set of strings 4, and the set of strings 4 generates the tone. Thus, the automatic playing subsystem plays a piece of music without any fingering on the keyboard.

When a user selects the electronic tone generator 13, the data processor 10 transfers the music data codes to the electronic tone generator 13 at the appropriate timings, and the electronic tone generator 13 produces an analog audio signal from the music data codes. The electronic tone generator 13 radiates the electronic tones corresponding to the piano tones from a suitable sound source such as, for example, a speaker system and/or headphone. The automatic playing subsystem may perform an ensemble between the solenoid-operated key actuators 14 and the electronic tone generator 13.

The music data generating subsystem includes an array of hammer sensors 21, a data processor 28 and a music data code generator 29. The hammer sensors 21 monitor the hammer assemblies 2, respectively, and generate hammer signals representative of current physical quantity of the hammer assemblies 2 on trajectories. In this instance, the hammer sensor 21 determines an angle between the rest position and the current hammer position, and, accordingly, the hammer signals represent the angles or the current hammer positions of the associated hammer assemblies 2. The hammer signals are supplied to a data input port of the data processor 28, and are converted to digital signals by means of a suitable analog-to-digital converter (not shown). The data processor 28 periodically scans the data input port, and stores pieces of hammer data in a working memory (not shown) for all of the hammer assemblies 2. Thus, the data processor 28 repeats the data scanning and the data fetching at time intervals so that a series of the pieces of hammer data is stored in the working memory for each of the black/white key 1. The music data code generator 29 analyzes the pieces of hammer data representative of the hammer motion on the trajectory. The music data code generator 29 determines specifies the depressed black/white keys 1, and determines the lapse of time from the initiation of performance to each event. The music data code generator 29 calculates the velocity on the basis of the variation of the angle. Thus, the music data code generator 29 obtains the pieces of music data information on the basis of the pieces of hammer data, and stores the pieces of music data information in a set of music data codes. The music data codes are stored in a suitable information storage medium (not shown). Otherwise, the music data codes are transferred through a public or private communication network to another musical instrument or a data storage.

Hammer Sensor

Figure 4:
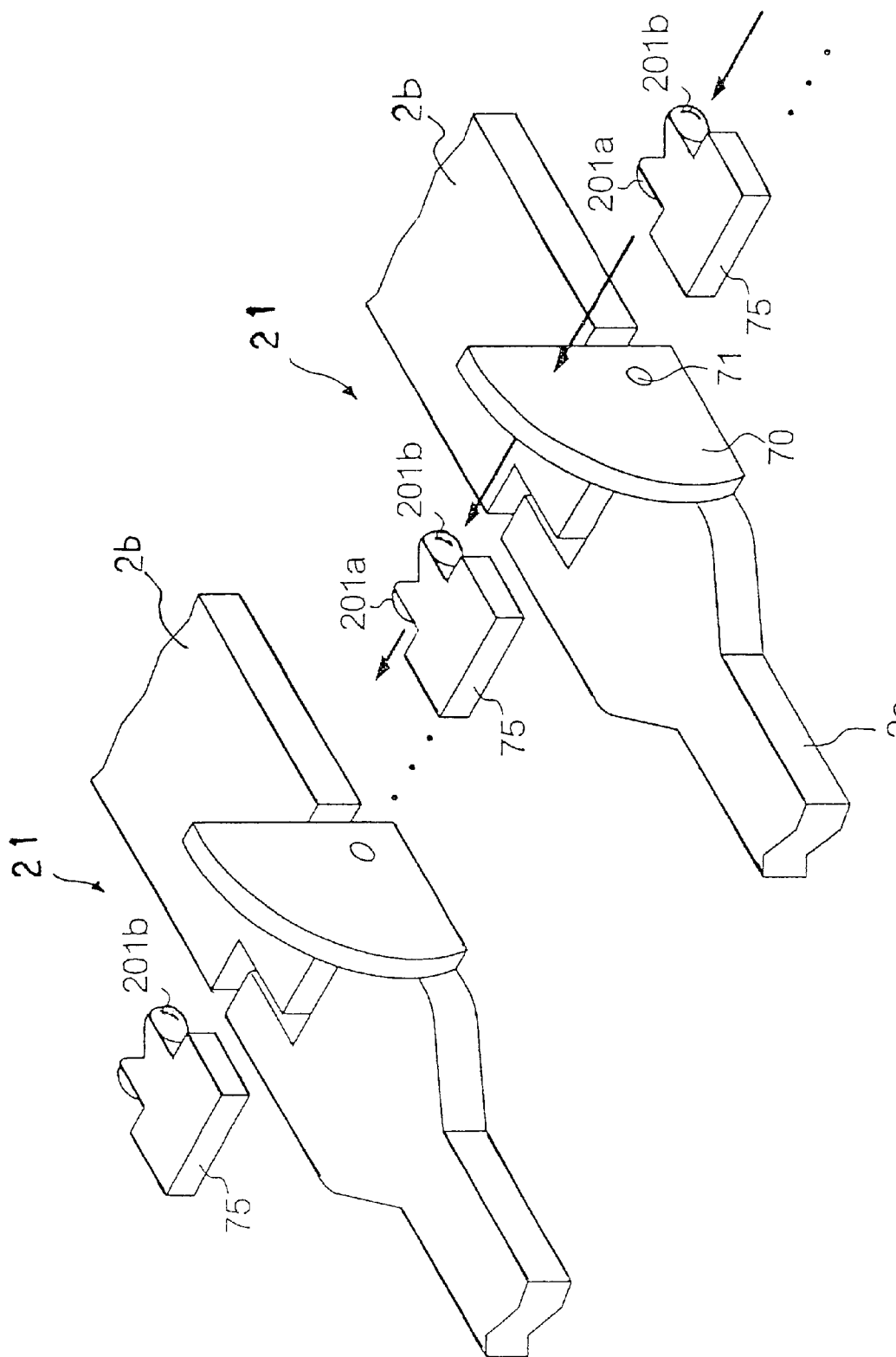
FIG. 4 is a perspective view showing hammer sensors in disassembled state.
Figure 5:
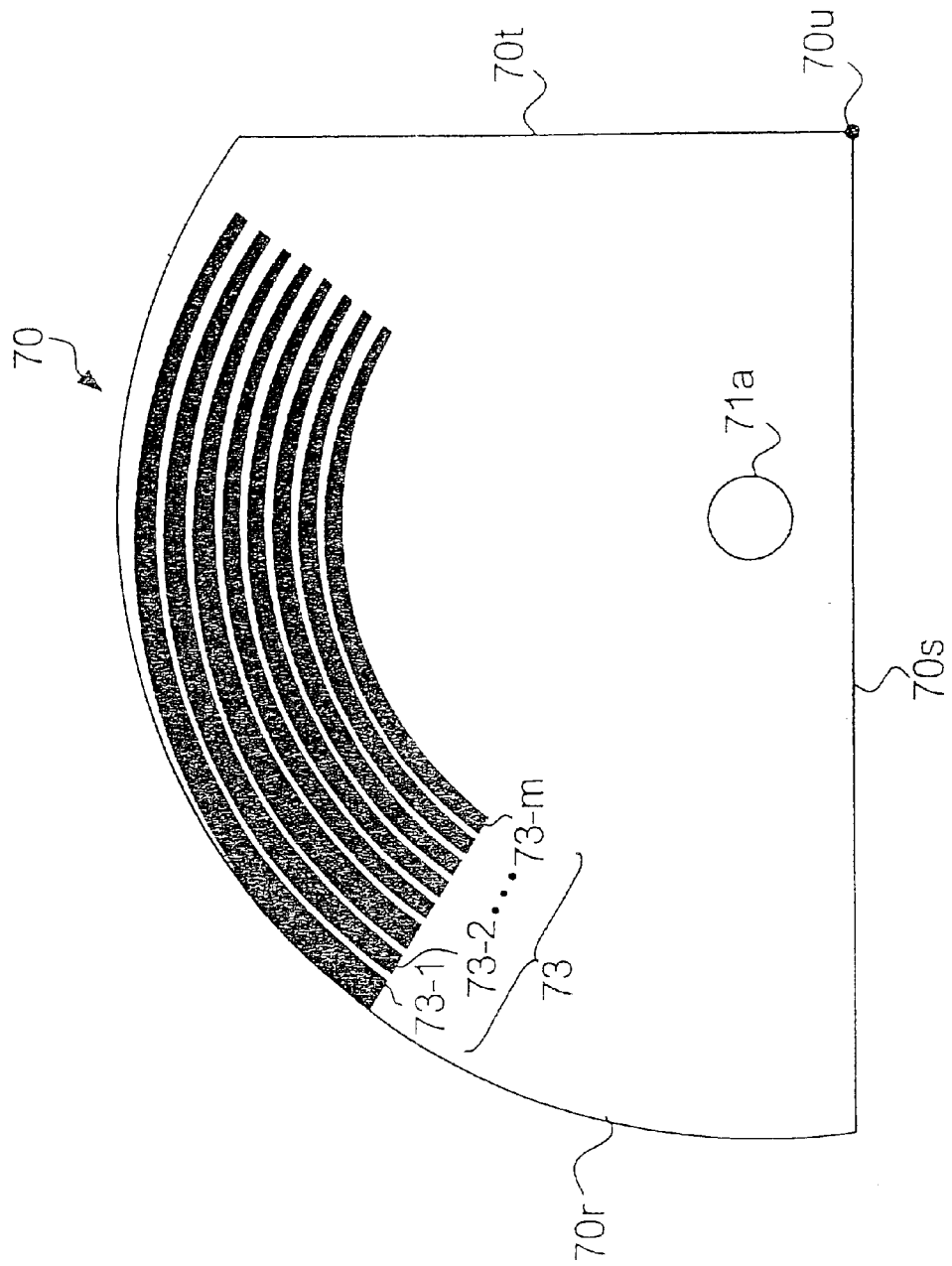
FIG. 5 is a front view showing a photo-filter plate forming a part of the hammer sensor.

Turning to FIG. 4 of the drawings, the hammer sensors 21 are provided in association with the hammer assemblies 2. The hammer assembly 2 has a manner felt at the leading end of a hammer shank 2a, and the hammer shank 2a is rotatably connected to a hammer shank flange 2b by means of a pin 71. The pin offers an axis of rotation to the hammer shank 2a, and the hammer shank 2a is driven for rotation around a pin 71.

The hammer sensors 21 are similar to one another. Each hammer sensor 21 includes a photo-filter plate 70, a photo radiating port 201a and a photo receiving 201b. The photo-filter plate 70 is formed in a generally sectorial shape, and has a center axis. The photo-filter plate 70 is fixed to a side surface of the hammer shank 2a in such a manner that the axis of rotation is aligned with the center axis thereof. In this instance, the photo filter plate 70 is adhered to the side surface of the hammer shank 2a by means of a pressure sensitive adhesive double coated tape. The photo radiating port 201a of each hammer sensor 21 is integral with the photo receiving port of the adjacent hammer sensor 21. The photo radiating port 201a and the photo receiving port 201b of the adjacent hammer sensor 21 are assembled with a prism 75 for forming a photo device, and are directed in the opposite directions. Accordingly, the photo receiving port 202b of each hammer sensor 21 is integral with the photo radiating port 201a of the adjacent hammer sensor 21, and the photo receiving port 202b, the photo radiating port 201a of the adjacent hammer sensor 21 and the prism 75 form in combination the next photo device. The optical path of the photo radiating port 201a is aligned with the optical path of the photo receiving port 201b. The photo-filter plates 70 are alternated with the photo devices, and the photo devices are arranged in such a manner that the optical paths of the photo radiating/photo receiving ports 201a/201b are offset from the center axes of the photo-filter plates 71. The photo-filter plate 70 has a sectorial portion 70r and extended portions 70s and 70t. The center of the sectorial portion 70r is indicated by a circle 71a, and the center 71a is aligned with the pin 71. The extended portion 70s projects from one of the two radial surfaces of the sectorial portion 70r, and the other extended portion 70s projects from the other radial surface. The extended portion 70s is merged with the other extended portion 70t at a corner 70u.

The photo-filter plate 70 is formed of transparent material such as, for example, polyethylene terephthalate, and an arc pattern 73 is formed on the major surface of the photo-filter plate 70. The arc pattern 73 consists of several arcs 73-1, 73-2, . . . and 73-m, and are non-transparent. The arcs 73-1, 73-2, . . . and 73-m are coaxially arranged around the center of the sectorial portion 70r, and are varied in width. The arcs 73-1, 73-2, . . . and 73-m are widest at the leftmost ends, and are the narrowest at the rightmost ends. The width is gradually varied so that each transparent gap between adjacent two arcs is increased from the leftmost end toward the rightmost end. Accordingly, the ratio of the non-transparent portion to the transparent portion is varied together with the angle. In this instance, the ratio of the non-transparent portion to the transparent portion is increased in the counter clockwise direction.

Figure 6B:
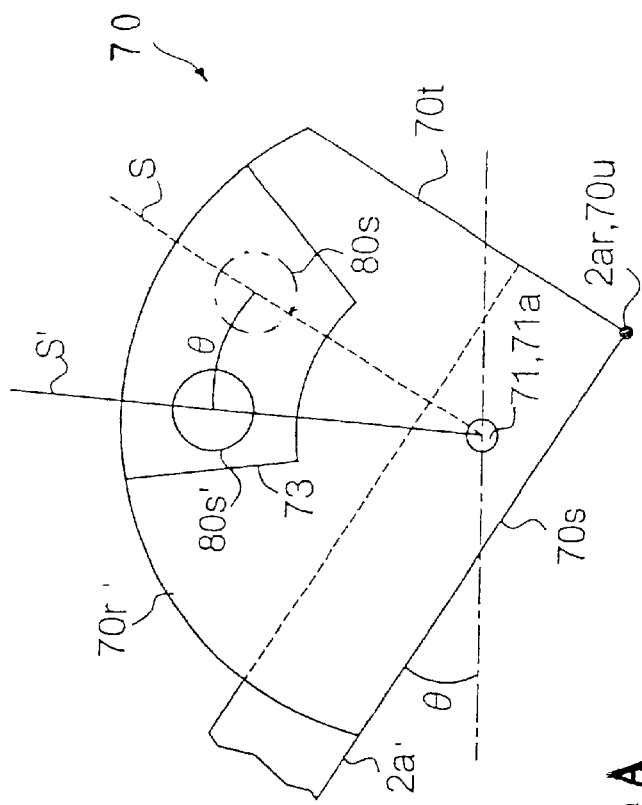
FIGS. 6A and 6B are front views showing the photo-filter plate at different angular positions.
Figure 6A:
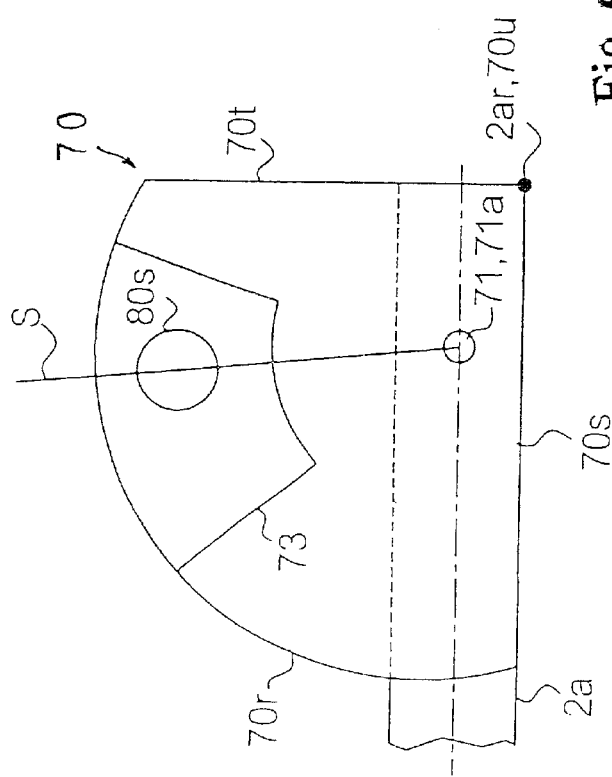

FIG. 6A shows the photo-filter plate 70 fixed to the hammer shank 2a. The radial surface of the extended portion 70s is coplanar with the lower surface of the hammer shank 2a, and the radial surface of the other extended portion 70t is coplanar with the end surface of the hammer shank 2a. The corner 70u is aligned with the line 2ar at which the lower surface meets the end surface. The centerline 71a of the photo-filter plate 70 and the centerline of the pin 71 are coincident with one another, and those centerlines are perpendicular to the centerline of the hammer shank 2a. Thus, the photo-filter plate 70 is designed to be easily assembled with the hammer shank 2a. When the hammer assembly 2 is at the rest position, the optical path 80s of the photo radiating port 201a crosses the arc pattern 73 as shown in FIG. 6A. Reference "S" designates a virtual line which is drawn between the centerline 71a and the center of the optical path 80s.

A pianist is assumed to depress the associated black/white key 1. The action mechanism 3 gives rise to the rotation of the hammer assembly 2, and the hammer shank 2a changes the position from 2a to 2a' as shown in FIG. 6B. The angle between the positions 2a and 2a' is labeled with θ. The optical path between the photo radiating port 201a and the photo receiving port 201b crosses the photo-filter plate 70 at 80s'. The angle between 80s and 80s' is equal to the angle between 2a and 2a', and is also labeled with θ.

As described hereinbefore, the ratio of the non-transparent portion to the transparent portion is increased in the counter clockwise direction. This means that the optical intensity at the photo receiving port 201b is decreased in the counter clockwise direction. In other words, while the hammer shank 2a is being rotated from the rest position to the striking point, the optical intensity at the photo receiving port 201b is gradually decreased. The decrement at unit angle is arbitrarily designed. For this reason, the angle θ is determinable by calculating the difference in the optical intensity.

Figure 1:
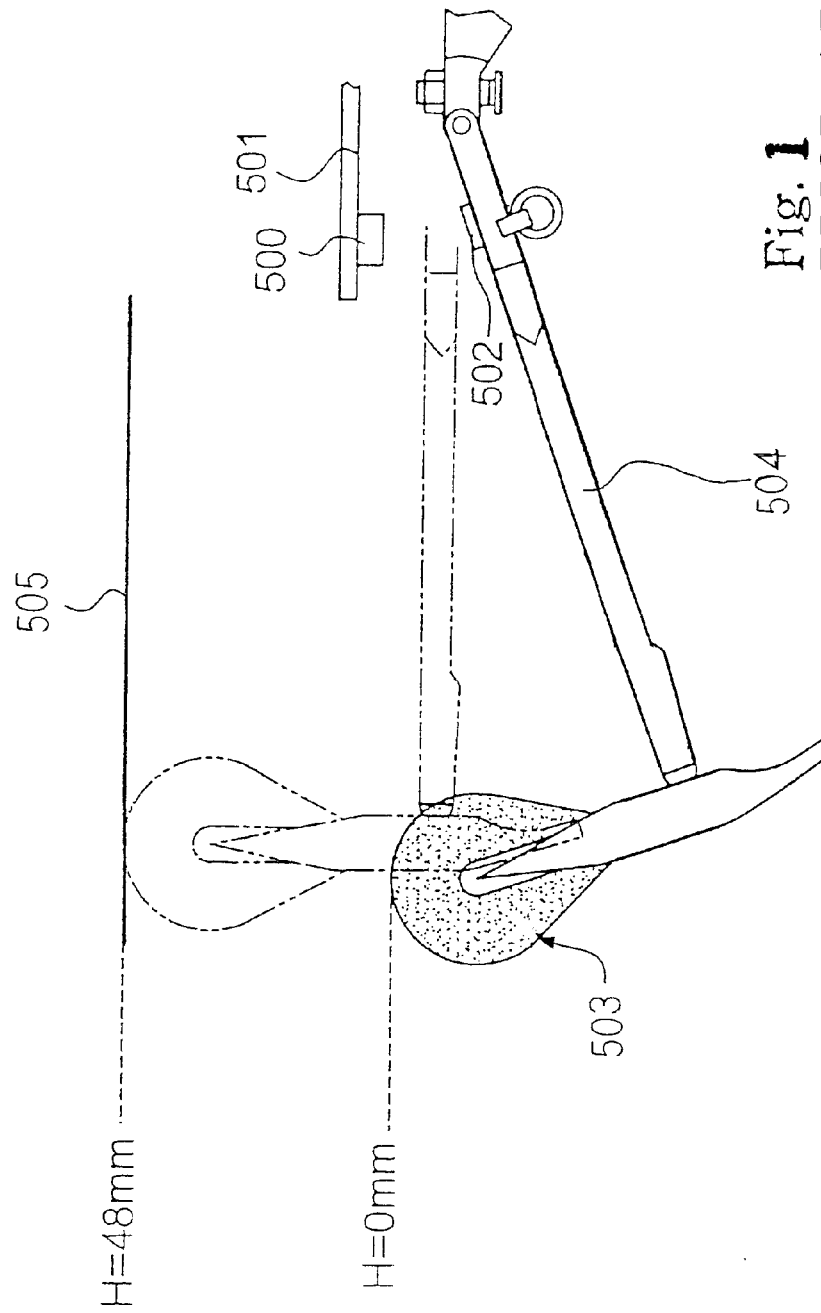
FIG. 1 is a side view showing the prior art hammer sensor for detecting the current hammer position.
Figure 2:
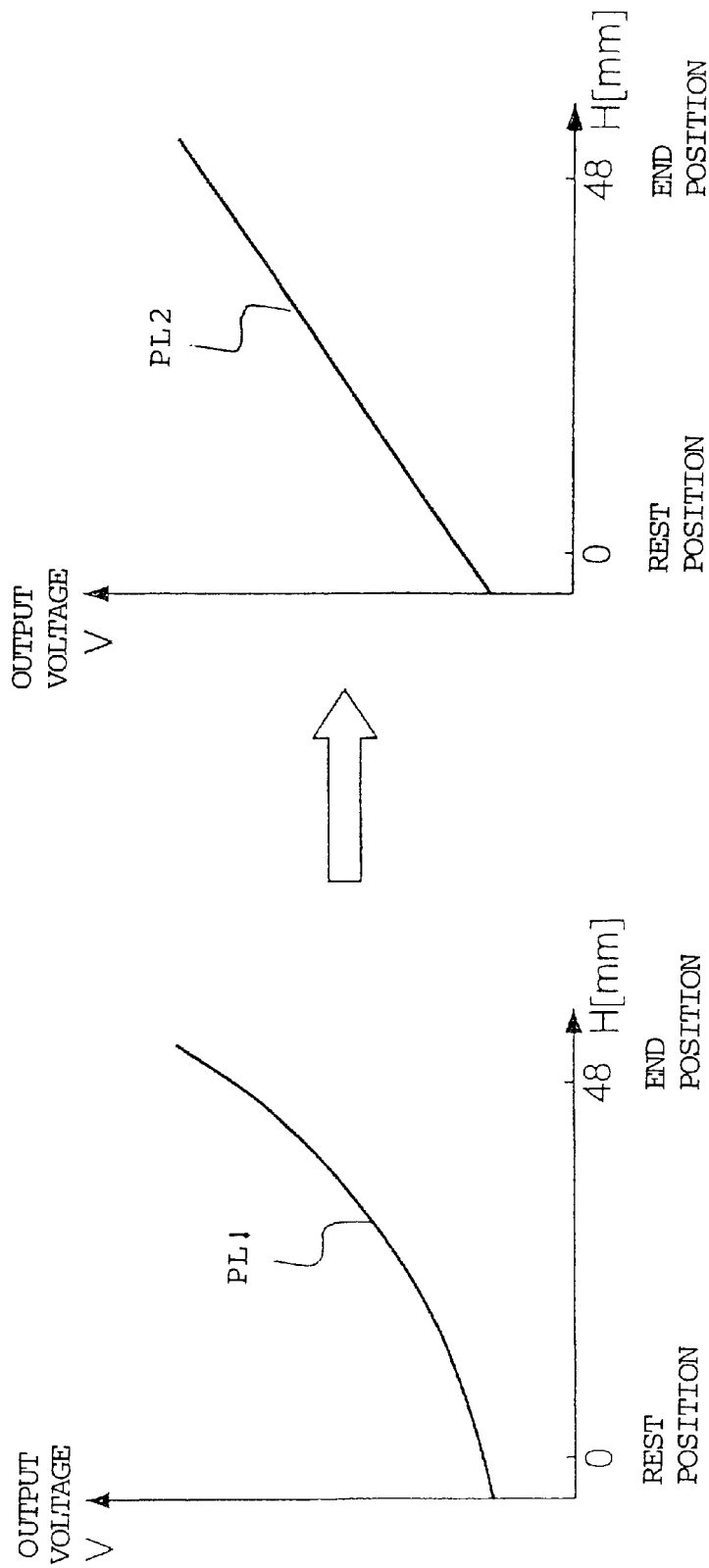
FIG. 2A is a graph showing the relation between the current hammer position and the output voltage.
FIG. 2B is a graph showing the relation between the hammer position and the output voltage after the linear approximation.

The photo receiving port 201b is connected to a photo detecting element such as, for example, a photo diode, and the photo detecting element is connected to a suitable converter to the signal output port. The photo detecting element coverts the light to photo current, and the amount of photo current is proportional to the optical intensity. The converter is operative to convert the photo current to a dc voltage, and the dc voltage is inversely proportional to the amount of photo current. For this reason, the output voltage of the photo detecting element is linearly increased inversely proportional to the optical intensity like plots PL2 shown in FIG. 2B. Thus, the hammer sensor 21 exhibits the linear optical intensity-to-voltage characteristics, and the error due to the non-linearly is never introduced into the hammer signal.

Figure 7:
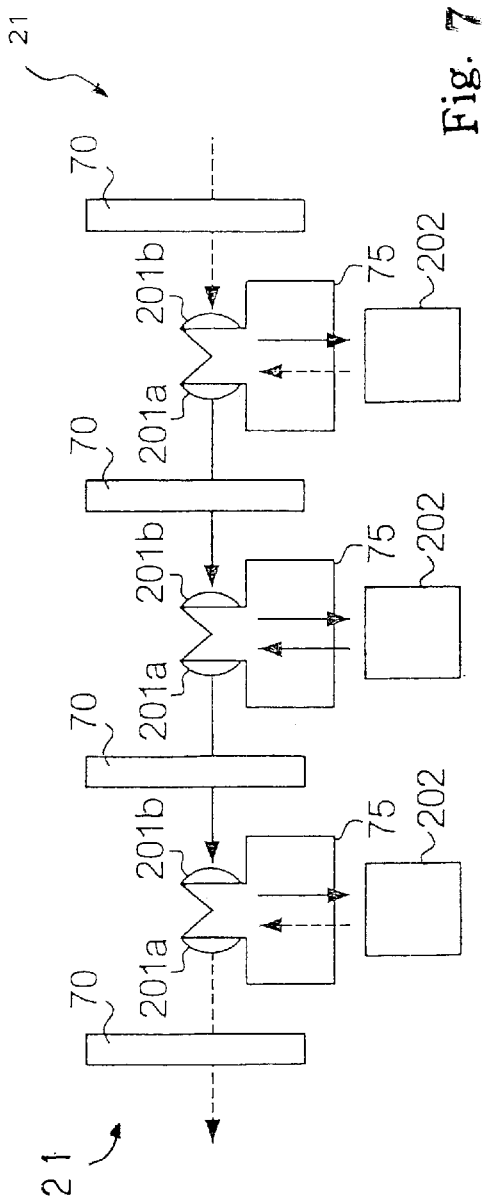
FIG. 7 is a schematic plane view showing the arrangement of the hammer sensors.
Figure 8:
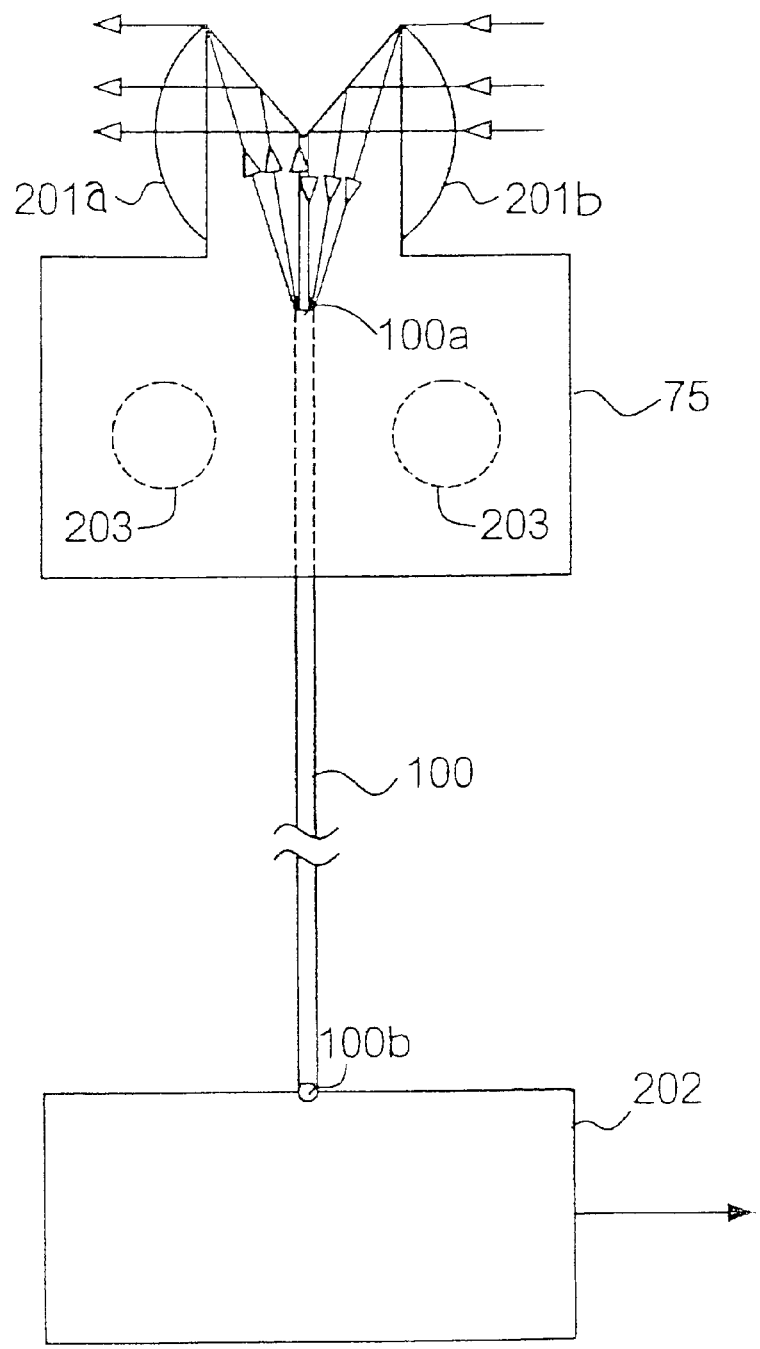
FIG. 8 is a schematic view showing a photo device connected to a combined photo element.
Figure 9:
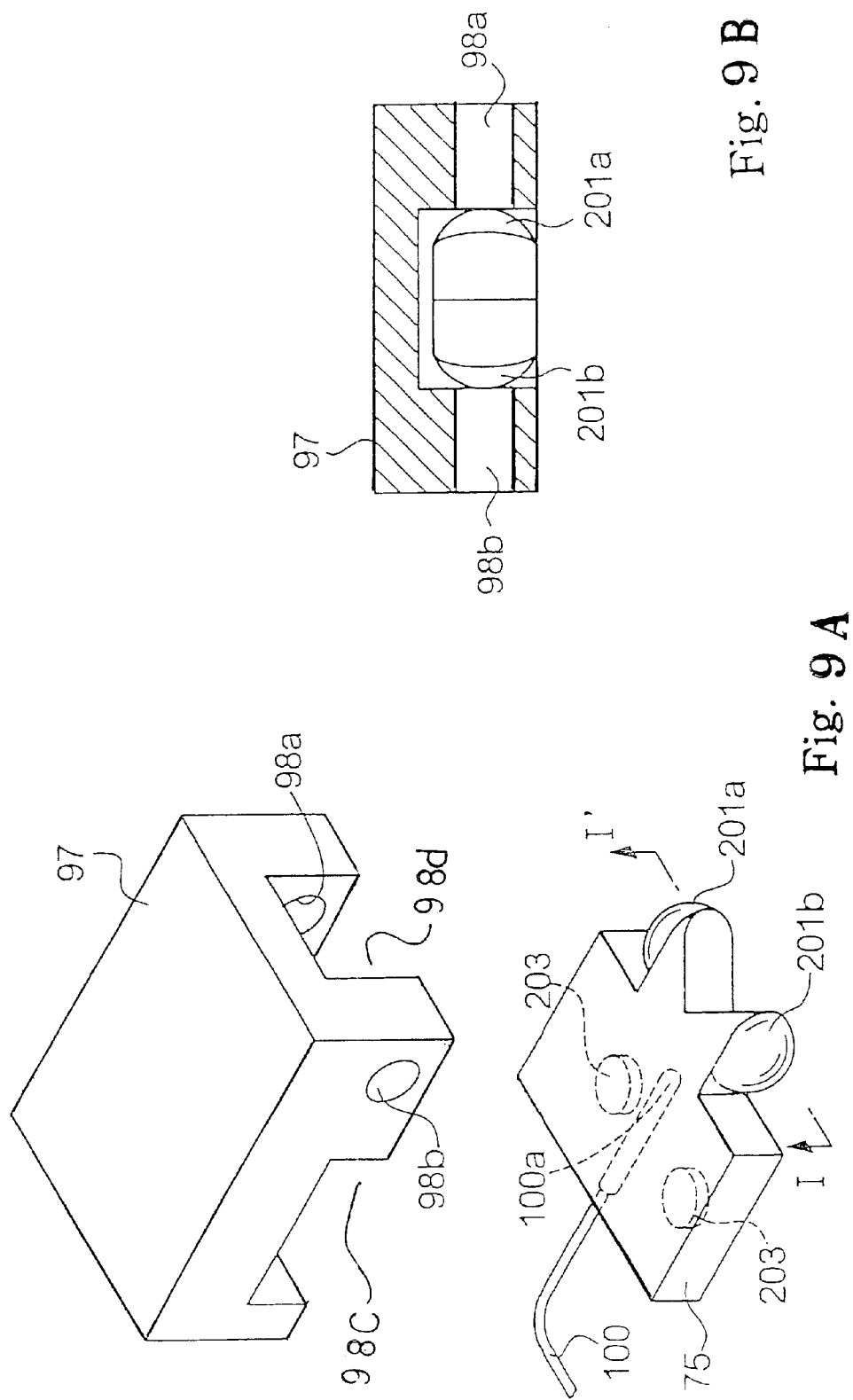
FIG. 9A is a perspective view showing the photo device separated from a cover.
FIG. 9B is a cross sectional view taken along line I—I and showing the photo device assembled with the cover.

The photo devices are alternated with the photo-filter plates 70, and the photo device includes the photo radiating port 201a, the photo receiving port 201b and a prism 75 as shown in FIGS. 7 and 8. The photo radiating port 201a and the photo receiving port 201b are implemented by convex lenses, respectively. The prism 75 is formed of transparent synthetic resin such as, for example, acrylic resin, and has a notch between a pair of flat surfaces parallel to each other. The photo radiating port 201a is fixed to one of the flat surfaces of the pair, and the photo receiving port 201b is fixed to the other flat surface. The notch is defined by inclined surfaces, and light beams are respectively reflected on the inclined surfaces so as to change the optical paths as indicated by arrows. The prism 73 is formed with a pair of locating recesses 203 and a thin hole, which will be described herein later in detail.

The photo device is connected to a combined photo element 201, which has a photo emitting element and a photo detecting element, and optical fibers 100 propagate the light between the combined photo element 201 and the photo device. The optical fiber 100 is inserted into the thin hole, and the leading end of the optical fiber 100 reaches the bottom surface of the thin hole. The combined photo element 202 emits the light and converts the light to the hammer signal, alternately, like a time sharing fashion. In this instance, the combined photo elements 202 are sequentially emit the light from the rightmost element 202 toward the leftmost element 202 as shown in FIG. 7, and the light beams are respectively incident on the combined photo elements 202 on the left side.

As described hereinbefore, the photo radiating port 201a of a photo device is paired with the photo receiving port 201b of the adjacent photo device, and the optical path is created therebetween through the photo-filter plate 70. Assuming now that a light beam is incident on the photo receiving port 201b or the convex lens of the photo device shown in FIG. 8 in a time slot assigned to the light-to-current conversion, the incident light is reflected on the right inclined surface, and the reflected light is converged to the end 100a to the optical fiber 100. The light is propagated through the optical fiber 100 to the combined photo element 202. The photo detecting element of the combined photo element 202 converts the light to the photo current, and the suitable converter produces the hammer signal from the photo current.

In the next time slot assigned to the photo emission, the photo emitting element of the combined photo element 202 emits the light, and the light is propagated from the other end 100b through the optical fiber 100. The light is radiated from the end 100a to the prism 75. The light proceeds to the inclined surfaces, and is reflected thereon. The light is split into two light beams, and the light beams are directed to the photo radiating port 201a and the photo receiving port 201b. The parallel light is radiated from the photo radiating port 201a or the convex lens to the adjacent photo device.

Figure 10:
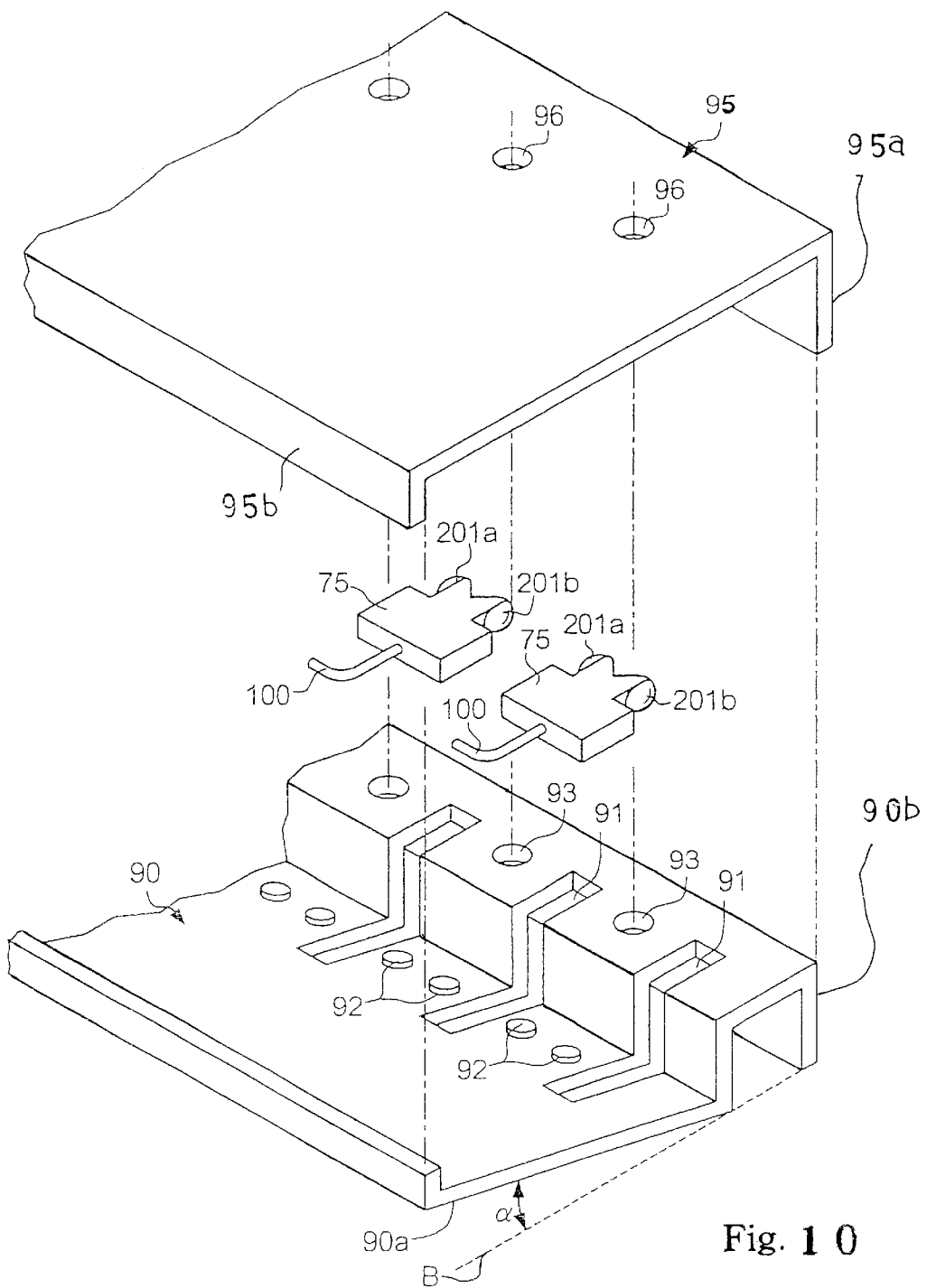
FIG. 10 is a perspective view showing an array of the photo devices disassembled from a base plate.

The photo device is assembled with a photo-shield cover 97. The photo-shield cover 97 is formed of non-transparent synthetic resin. The photo-shield cover 97 may be colored in black. A hollow space is formed in the photo-shield cover 97, and through-holes 98a/98b are formed in the side walls of the photo-shield cover 97. Rectangular holes 98c are further formed in the side walls, and another rectangular hole 98d is formed in the front wall of the photo-shield cover 97. A narrow slit (not shown) is formed in the rear wall of the photo-shield cover 97. The photo device is snugly received in the hollow space, and the photo-shield cover 97 blocks the upper surface of the prism 75 from undesirable light. The locating recesses 203 are exposed, because the lower surface of the prism 75 is not covered with the photo-shield cover 97. The photo-shield covers 97 are removed from the photo devices shown in FIG. 10.

When the photo device is assembled with the photo-shield cover 97, the optical fiber 100 passes the thin slit, and the through-holes 98a/98b are aligned with the photo radiating port 201a and the photo receiving port 201b, respectively. For this reason, the light beam is radiated from the photo radiating port 201a through the through-hole 98a toward the photo-filter plate 70, and the incident light beam reaches the photo receiving port 201b through the other through-hole 98b.

A base plate 90 and a top plate 95 form in combination a sensor holder. The photo devices assembled with the photo-shield covers 97 are mounted on the base plate 90 (see FIG. 10). The base plate 90 is formed of nontransparent material such as, for example, an aluminum plate, an iron plate or a black synthetic resin plate. The base plate 90 has a flat portion 90a and a raised portion 90b. The raised portion 90b has an inverted U-letter shape. Slits 91 are formed in the base plate 90 at intervals, and each slit 91 extends from the flat portion 90a to the raised portion 90b. The slits 91 are respectively assigned to the photo-filter plates 70. When the base plate 90 is fixed to the shank flange rail 8 through sensor stays 99 (see FIG. 11), the photo-filter plates 70 are placed in the slits 91, and are movable therein without any obstacle. Tuning holes 93 are further formed in the raised portion 90b, and repetition regulating screws are exposed to the tuning holes 93.

Plural pairs of locating lugs 92 are formed on the flat portion 90a, and are snugly received in the plural pairs of locating recesses 203. When a worker mounts the photo devices on the base plate 90, the worker aligns the pair of locating recesses 203 with the pair of locating lugs 92, and pushes the photo device. Then, the pair of locating lugs 92 is snugly received in the pair of locating recesses 203, and the lower surface of the prism 75 is brought into contact with the upper surface of the flat portion 90a. The inclined surfaces of the prism 75 are faced to the vertical wall of the raised portion 90b. Thus, the flat portion 90a and the vertical wall prevent the lower surface of the prism 75 and the inclined surfaces from undesirable light. When the photo devices are mounted on the flat portion 90a, the optical paths perpendicularly extend over the slits 91.

The photo devices mounted on the base plate 90 are covered with the top plate 95. The top plate 95 is formed of the non-transparent material as similar to the base plate 90. The top plate 95 has both end portions 95a/95b downwardly bent from the remaining portion. The flat portion 90a rearwardly extends from the raised portion 90b at angle α with respect to the horizontal plane B, and the rear end portion is upwardly bend. When the top cover 95 is fallen onto the base plate 90, the front end portion 95a is brought into contact with the upper surface of the raised portion 90b, and the rear end portion 95b is brought into contact with the rear end portion of the flat portion 90a. The top plate 95 is secured to the base plate 90 by means of a suitable fastening means. As a result, the photo devices assembled with the photo-shield covers 97 are accommodated in the space between the base plate 90 and the top plate 95.

Tuning holes 96 are formed in the top plate 95 at intervals. When the top plate 95 is secured to the base plate 90, the tuning holes 96 are aligned with the tuning holes 93, respectively. The tuning holes 93 and 96 allow a tool to access the repetition regulating screws 304 (see FIG. 12) without disassembling the top plate 95 and the base plate 90 from the sensor stays 99.

As will be understood from the foregoing description, the sensor holder 90/95 and the photo-shield covers 97 prevent the photo devices from the environmental light, and the noise does not rise on the hammer signals. Moreover, the pairs of locating recesses 203 and the pairs of locating lugs 92 make the assembling work easy, and render the photo radiating ports 201a aligned with the associated photo receiving ports 201b. Thus, the usage of the sensor holder 90/95 is preferable from these viewpoints.

Figure 11:
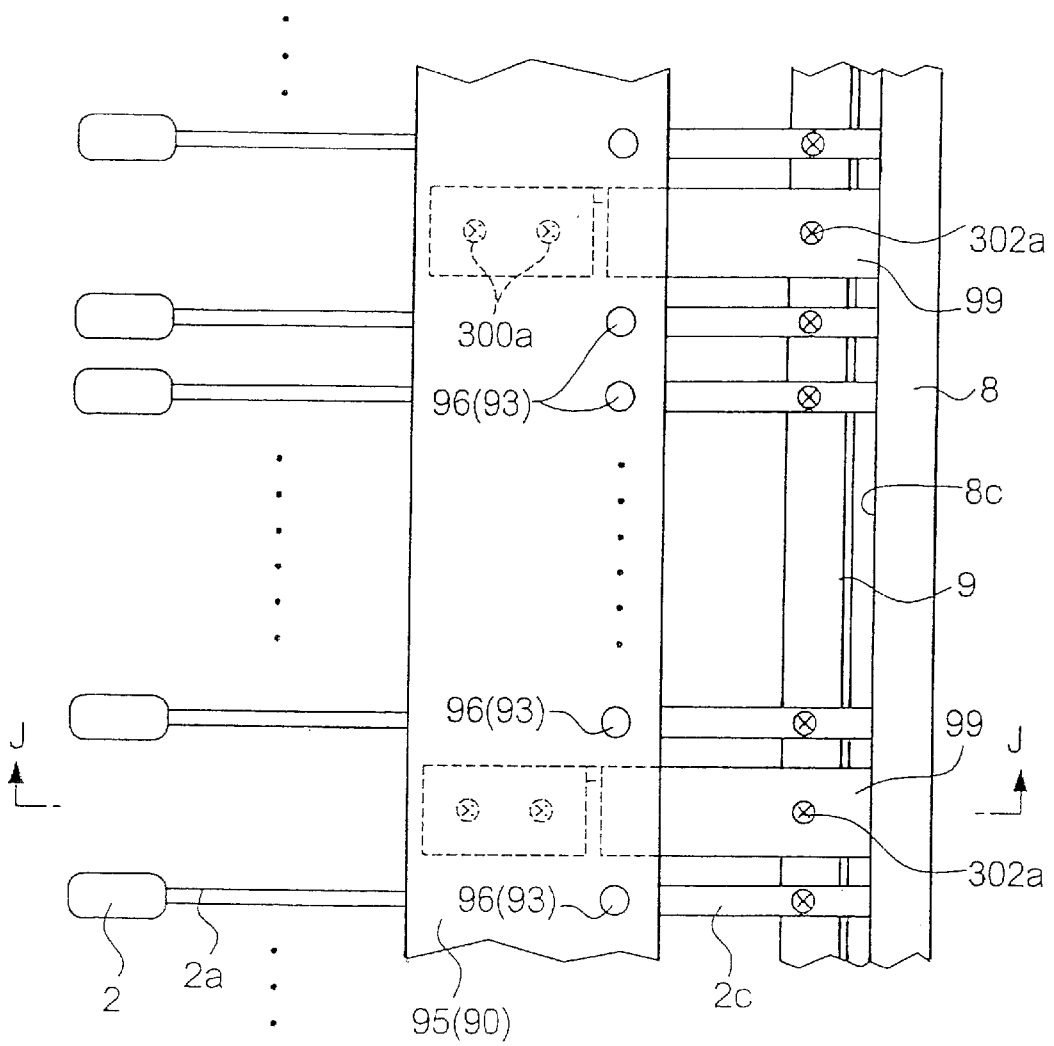
FIG. 11 is a plane view showing a sensor holder supported by a shank flange rail.
Figure 12:
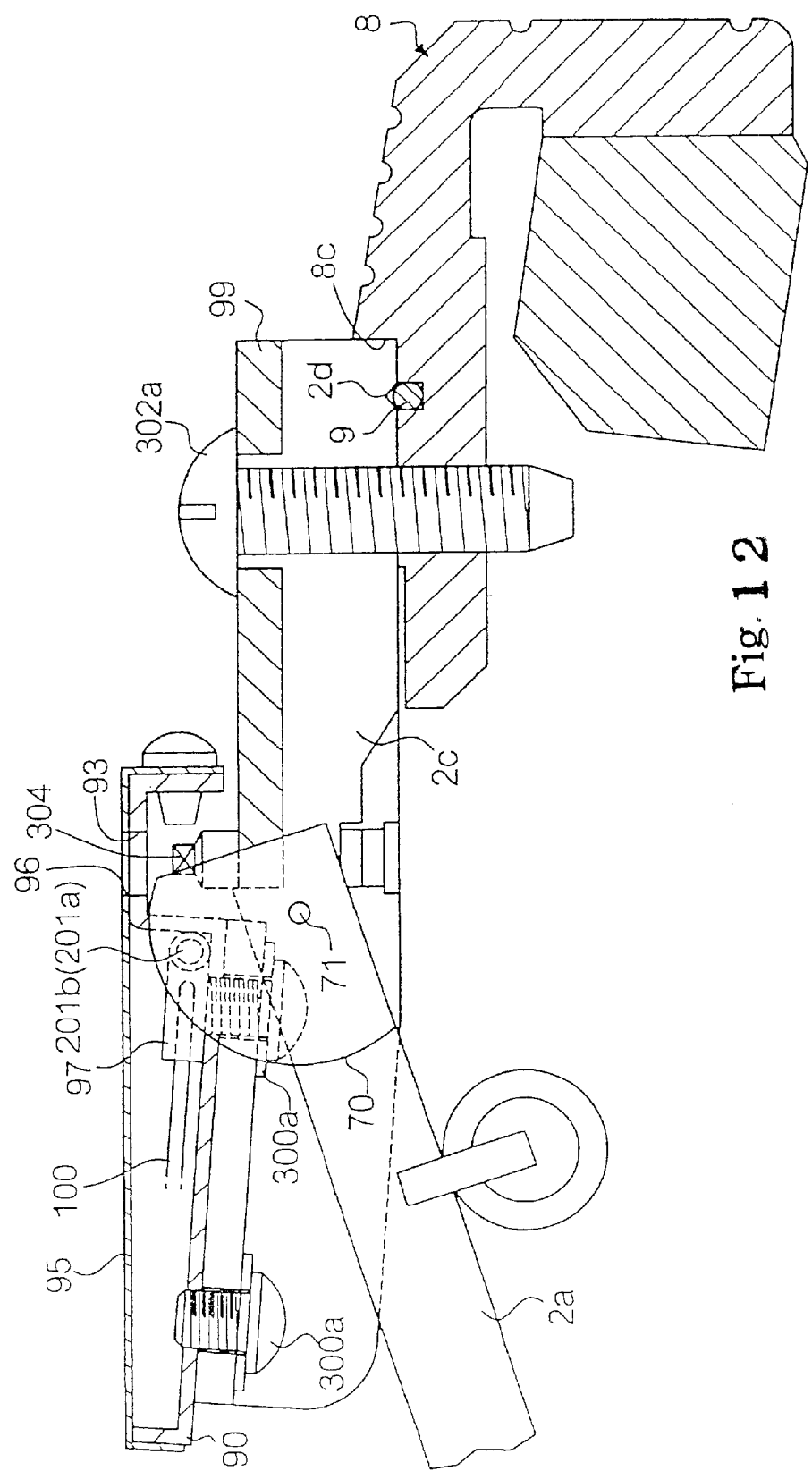
FIG. 12 is a cross sectional side view taken along line J—J and showing the hammer sensors installed inside a grand piano.

Description is hereinbelow made on how the hammer sensors 21 are installed in association with the hammer assemblies 2. FIGS. 11 and 12 show the sensor holders 90/95 supported by the shank flange rail 8. The sets of strings 4 are divided into four or five groups. The sensor stays 99 are connected to the shank flange rail 8, and rearwardly project into the gaps among the hammer assemblies under gaps between the string groups. The sensor holder 90/95 is connected at the rear end portions of the sensor stays 99.

Figure 13:
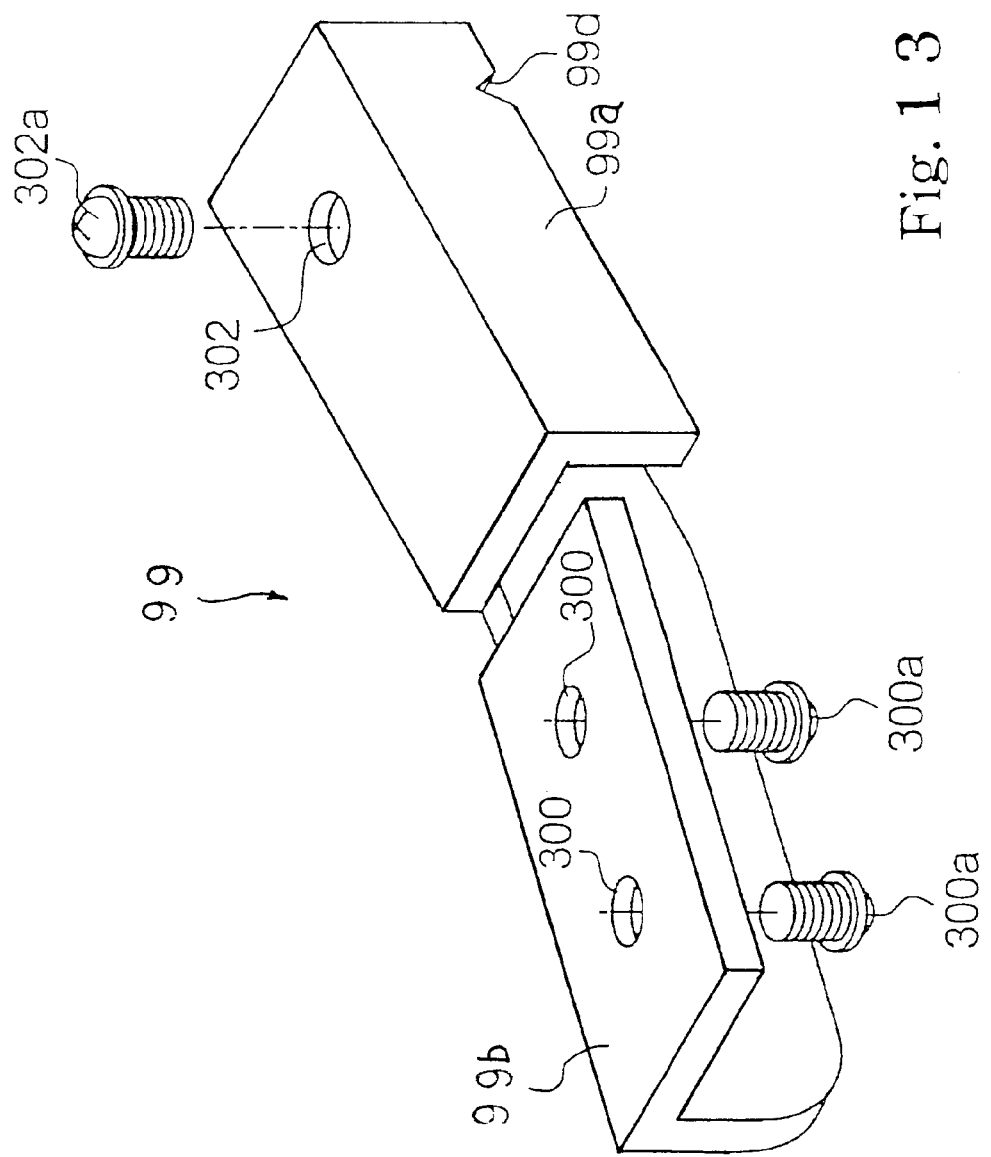
FIG. 13 is a perspective view showing a sensor stay.

First, the sensor stay 99 is described in detail with reference to FIG. 13. The sensor stay 99 is broken down into two portions 99a and 99b. The front portion 99a is an inverted U-letter shape in cross section, and the rear portion 99b has an inverted L-letter shape in cross section. The front portion 99a is spaced from the rear portion 99b, and the rear portion 99b is upwardly bent with respect to the front portion 99a. A through-hole 302 is formed in the front portion 99a, and permits a bolt 302a to be downwardly inserted thereinto. On the other hand, two through-holes are formed in the rear portion 99b, and permit two bolts 300a to be upwardly inserted thereinto, respectively. A pair of notches 99d is formed in the vertical walls of the front portion 99a, and is spaced from the front end surface by a distance equal to the distance between the vertical surface 8c of the shank flange rail 8 and a guide wire 9 inserted into a groove of the shank flange rail 8 (see FIG. 12).

The guide wire 9 is used for exactly locating the hammer assemblies 2 on the shank flange rail 8. The hammer shanks 2a are rotatably connected to hammer shank flanges 2c, and notches 2d are formed in the hammer shank flanges 2c. The shank flange rail 8 is formed with a step, and the vertical surface 8c is spaced from the groove and, accordingly, the guide wire 9 by the predetermined distance. The distance between the end surface of the hammer shank flange 2c and the notch 2d is adjusted to the predetermined distance. When a worker secures the hammer assemblies 2 to the shank flange rail 8, the worker aligns the notches 2d with the guide wire 9, and secures the hammer shank flange 2c to the shank flange rail 8 by means of bolts. Thus, the guide wire 9 is provided for the purpose of exactly locating the hammer assemblies 2 on the shank flange rail 8.

The sensor holder 90/95 is installed inside the grand piano as follows. The photo-filter plates 70 are adhered to the side surfaces of the hammer shanks 2a. The sensor stays 99 are secured to the base plate 90 by means of the bolts 300a. Subsequently, the sensor stays 99 are moved into the gaps among the hammer assemblies 2, and the front end surfaces are brought into contact with the vertical surface 8c. The notches 99d are to be engaged with the guide wire 9. When the sensor stays 99 are exactly located on the shank flange rail 8, the photo-filter plates 70 are disposed in the slots 91, and are movable therein without any obstacle. Thus, the sensor stays 99 are easily located on the shank flange rail 8, and make the photo-filter plates 70 aligned with the slits 91 formed in the base plate 90. The bolts 302$a$ are inserted into the through-holes 302, and are screwed into the shank flange rail 8 as shown in FIGS. 11 and 12.

The photo-shield covers 97 are attached to the photo devices, and the photo devices are exactly located at the predetermined positions by virtue of the locating recesses 203 and the locating lugs 92. The photo devices may be arranged on the base plate 90 before the sensor stays 99 are secured to the shank flange rail 8. Finally, the photo devices on the base plate 90 are covered with the top plate 95, and the top plate 95 is fixed to the base plate 90 by means of suitable fastening means.

As will be understood, the notches 99$d$, the vertical surface 8$c$ and the guide wire 9 make the base plate 90 located at the appropriate position over the hammer shanks 2$a$, and the photo-filter plates 70 are disposed in the slits 91 at the appropriate position. The locating recesses 203 and the locating lugs 92 make the photo devices appropriately located with respect to the photo-filter plates 70. Thus, the manufacturer easily installs the hammer sensors 21 inside the grand piano by using the sensor holder 90/95 and the sensor stays 99.

Behavior of Automatic Player Piano

A pianist generates the music data codes representative of a performance through the automatic player piano, and instructs the automatic player piano to perform a piece of music without any fingering on the keyboard. Thus, the automatic player piano is selectively established in a music data code generating mode and an automatic playing mode. In the music data code generating mode, the music data codes are written into a suitable information storage medium such as, for example, a semiconductor memory, a magnetic disc or an optical disc. Otherwise, the music data codes are transferred through a public or private communication line to a data storage or another musical instrument. On the other hand, a set of music data codes is supplied to the automatic player piano through the public/private communication line or read out from the information storage medium, and the piano tones and/or electronic tones are generated on the basis of the set of music data codes.

The pianist is assumed to select the music data generating mode. The music data code generating subsystem is activated. While the pianist is fingering a piece of music, he or she is assumed to depress the white key 1 shown in FIG. 3, and, thereafter, release it.

Figure 14:
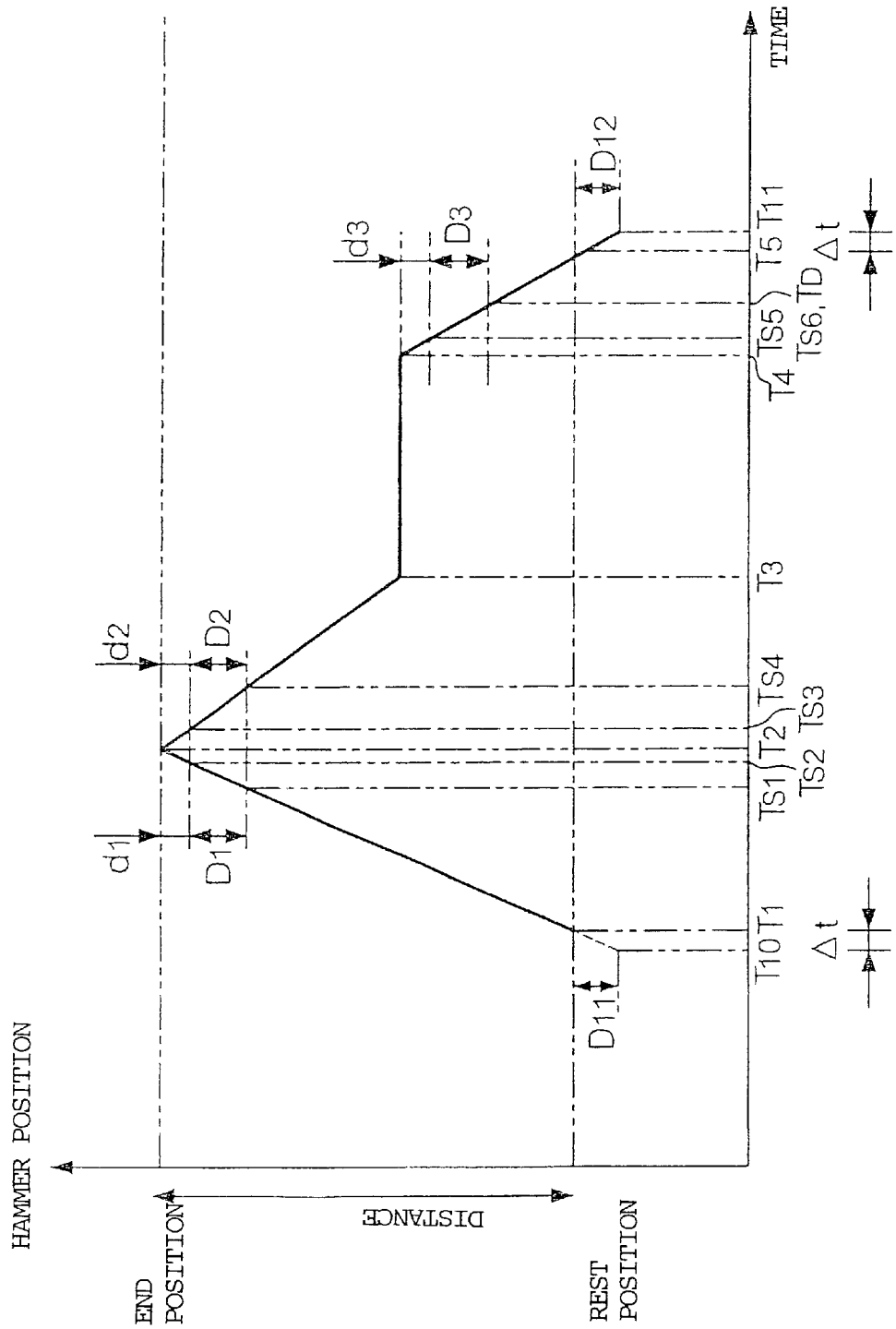
FIG. 14 is a diagram showing a trajectory of a hammer assembly.

When the pianist exerts force on the front portion of the white key 1, the front portion is sunk toward the end position, and the depressed white key 1 gives rise to actuation of the damper 6 and the action mechanism 3. The damper 6 is spaced from the set of strings 4, and the set of strings 4 gets ready to vibrate. The action mechanism 3 pushes the hammer shank 2$a$, and the hammer shank 2$a$ starts the rotation. When the jack is brought into contact with the regulating button, the jack turns, and the hammer assembly 2 escapes from the jack. The hammer assembly 2 is driven for free rotation, and strikes the set of strings 4. The strings 4 vibrate, and generate a piano tone. Upon the strike, the hammer assembly 2 rebounds on the set of strings 4, and is backwardly rotated. The hammer assembly 2 is received by the back check 3$a$, and the back check 3$a$ maintains the hammer assembly 2. When the pianist releases the depressed white key 1, the white key 1 returns toward the rest position, and the back check 3$a$ is sunk. Accordingly, the hammer assembly 2 returns toward the rest position. The damper 6 is brought into contact with the set of strings 3, again, on the way to the rest position, and the damper 6 absorbs the vibrations. Then, the piano tone is decayed. The hammer assembly 2 reaches the rest position, and, thereafter, the white key 1 reaches the rest position. The hammer motion is illustrated in FIG. 14.

In order to reproduce the piano tone, it is required to obtain the pieces of timing data representative of 1. a time T10 at which the white key 1 starts the downward motion,
2. a time T1 at which the hammer assembly 2 starts the rotation,
3. a time T2 at which the hammer assembly 2 strikes the strings 4,
4. a time T3 at which the back check 3$a$ receives the hammer assembly 2,
5. a time T4 at which the back check 3$a$ starts to return toward the rest position,
6. a time TD at which the damper 6 is brought into contact with the strings 4,
7. a time T5 at which the hammer assembly 2 returns to the rest position, and
8. a time T11 at which the white key 1 returns to the rest position.

The music data code generator 29 determines 9. the hammer velocity Vi immediately before the strike and the hammer velocity V2 immediately after the strike and
10. the hammer velocity V3 immediately after the release from the back check 3$a$.

The music data code generator 29 requires pieces of timing data representative of time Ts1 and time Ts2 on the way to the strings 4 and a piece of data information representative of the length of a section D1 for calculating the hammer velocity V1. Similarly, the music data code generator 29 requires pieces of timing data representative of time Ts3 and time Ts3 on the way to the rest position and a piece of data information representative of the length of a section D2 for calculating the hammer velocity V2. However, the hammer velocity V2 may be not required. The music data code generator 29 also requires pieces of timing data representative of time Ts5 and time Ts6 and pieces of data information representative of a distance d3 and the length of a section D3.

In detail, the hammer sensor 21 associated with the white key 1 monitors the hammer assembly 2 through the light beam at all times. While the hammer assembly 2 is staying at the rest position, the light beam 80$s$ passes the arc pattern 73 (see FIG. 6A), and the amount of light incident on the photo receiving port 201$b$ is not varied. The amount of light is at the maximum, and the potential level of the hammer signal is minimized. When the hammer assembly 2 starts the rotation, the rotation of the photo-filter plate 70 gives rise to decrease of the amount of light incident on the photo receiving port 201$b$, and the potential level of the hammer signal is increased. Since the data processor 28 periodically checks the data input port to see whether or not any hammer sensor 21 varies the potential level of the hammer signal, the music data code generator 29 easily determines the time T1.

The white key 1 starts the motion before the time T1. D11 is indicative of the length of a virtual section, and the music data code generator 29 divides the length of the virtual section D11 by the hammer velocity VI. The quotient is equivalent to the time interval between the key motion and the hammer motion. Then, the music data code generator 29 puts back the clock by the time equal to the quotient, and determines the time T10. The music data code generator 29 may store a set of values for the length of the virtual section D11 so as to select an appropriate value depending upon the hammer velocity V1.

When the piano tone is reproduced, the solenoid-operated key actuator 14 is to start to push the rear portion of the white key 1 at a time corresponding to the time T10. In other words, the servo-controller 12 supplies the driving signal to the solenoid-operated key actuator 14 at the time corresponding to the time T10. The music data code generator 29 determines a key-on at the time T10, and stores it in a music data code.

After time t1, the hammer assembly 2 is rotated toward the strings 4, and the light beam 80s is moved on the arc pattern 73 in the counter clockwise direction (see FIGS. 6A and 6B). The amount of light incident on the photo receiving port 201b is gradually decreased, and, accordingly, the magnitude of the hammer signal is increased. The data processor 28 periodically checks the data input port to see whether or not the hammer signal still increases the magnitude. When the hammer assembly 2 strikes the strings 4, the hammer assembly 2 rebounds thereon, and is rotated backwardly. For this reason, the light beam is moved on the arc pattern 73 in the clockwise direction, and the amount of light incident on the photo receiving port 201b is increased. Accordingly, the hammer signal decreases the magnitude. Then, the answer is changed to negative, and the music data code generator 29 determines the time T2 at the turning point. The music data code generator 29 determines the note-on event at time T2, and stores it in the music data code. In the playback, the electronic tone generator 13 starts to generate the electronic tone at a time corresponding to time T2, and the data processor 10 determines the trajectory (t, Vr) on the basis of time T10 and time T2.

In the prior art automatic player piano, the music data code generator estimates the note-on event at time T2 on the basis of time T10 reported by a key sensor, and estimated time T2 is liable to be deviated from the actual note-on timing. On the other hand, the music data code generator 29 directly determines the note-on event on the basis of the hammer motion reported by the hammer sensor 21. For this reason, the music data codes produced in the automatic player piano according to the present invention exactly describe the original performance.

Moreover, the turning point at time T2 is the actual end position of the trajectory of the hammer assembly 2, and the light intensity at the end position is actually measured. The position at time T1 is the actual rest position, and the light intensity at the rest position is easily determined. Even if the photo-filter plate 70 changes the transparency due to, for example, contamination, the combined photo element 202 changes the light emitting characteristics due to, for example, aged deterioration and/or the optical fiber 100 changes the light propagating characteristics, the music data code generating subsystem easily calibrates the relation between the potential level and the angle/hammer position on the basis of the measured values of the light intensity at the end/rest positions.

The music data code generator 29 calculates the hammer velocity V1 as follows. The length of the virtual section D1 and the difference d1 between the far end point of the section D1 and the strings 4 are stored in the music data code generator 29. The length of the section D1 and t he difference d1 are, by way of example, 5 millimeters and 0.5 millimeter, respectively. The music data code generator 29 calculates both end points of the section D1, and, accordingly, determines time Ts1 and Ts2 by comparing the actual value of the hammer signal with the expected values of the hammer signal at both end points. Then, the hammer velocity V1 is given as $$V1 = D1/(Ts2 - Ts1)$$

In case where the hammer velocity V2 is required, the music data code generator 29 similarly calculates it on the basis of the length of the section D2, which is spaced from the turning point by d2, and times Ts3/Ts4 at both ends of the section D2. Thus, the music data code generator 29 determines times Ts1/Ts2 and Ts3/Ts4 at both end points of the sections D1/D2 on the basis of actually measured time T2. For this reason, even if the strings are warped and/or the hammer sensors 21 are unintentionally moved, the music data code generator 29 exactly determines the hammer velocity. The loudness of the piano tone is proportional to the hammer velocity V1. Moreover, the arc pattern 73 was designed such that the potential level of the hammer signal is linearly varied. For this reason, the music data code generator 29 exactly determines the loudness of the piano tone. The loudness or the velocity is stored in a music data code.

The hammer assembly 2 is received by the back check 3a on the way toward the rest position at time T3, and stays on the back check 3a for a time period between time T3 and time T4. Since the hammer assembly 2 is not moved on the back check 3a, the hammer signal keeps the potential level constant. The music data code generator 29 checks the memory to see whether or not the hammer signal does not change the potential level for a certain time period. If the answer is given affirmative, the music data code generator 29 determines that the hammer assembly 2 was received by the back check 3a at time T3.

The music data code generator 29 further checks the memory to see whether or not the hammer assembly 2 restarts the backward rotation. When the music data code generator 29 finds the hammer assembly 2 to restart the backward rotation, the music data code generator 29 determines time T4.

After determination of time T4, the music data code generator 29 determines time Ts5 and time Ts6. The distance d3 and the length of section D3 have been known, the music data code generator 29 determines time Ts5 and time Ts6 as similar to time Ts1 and time Ts2. Then, the music data code generator 29 divides the length of the section D3 by the time period between time Ts5 and time Ts6, and determines the hammer velocity V3.

When the pianist releases the white key 1, the white key 6 starts to return toward the rest position, and permits the damper 6 to fall down. The damper 6 is brought into contact with the strings 4 at time TD, and absorbs the vibrations of the strings 4. In this instance, the length of the section D3 is adjusted to the distance over which the damper is fallen down. When the hammer assembly 2 reaches the far end position of the section D3, the music data code generator 29 assumes that the damper 6 is brought into contact with the strings 4, and decides time TD to be equal to time Ts6. The music data code generator 29 determines that the note-off event takes place at time TD, and stores it in a music data code.

In an actual performance, a pianist delicately controls th e velocity of the released key 1 in order to give his or her expression. When the pianist makes the black/white key 1 slowly return, the damper 6 is also fallen down slowly, and the vibrations of the strings 4 are prolonged. In detail, a string 4 is assumed to be generating a low-pitched tone. If the player slowly returns the black/white key 1, the vibrating string 4 begins to contact with the damper 6 before the damper 6 reaches the string 4. While the player is maintaining the black/white key 1 and, accordingly, the damper 6, the vibrations are continued, but the amplitude is gradually reduced. Thus, the player can prolong the tone by maintaining the black/white key 1 on the way to the rest position. In this instance, time TD is varied depending upon the hammer velocity V3. The length of the section D3 may be varied depending upon the hammer velocity V3 in order to make the timing to decay the piano tone identical with the tone decay in the actual performance.

After the release, the white key 1 is backwardly moved toward the rest position, and reaches the rest position at time T5. The white key 1 stops the motion at the rest position, and the hammer signal keeps the potential level constant. The music data code generator 29 checks the memory to see whether or not the hammer signal keeps the potential level constant for a certain time period. If the answer is given affirmative, the music data code generator 29 decides the white key 1 to reach the rest position at time T5.

Finally, the music data code generator 29 estimates time T11. The music data code generator 29 has a set of values for the section D12, and selects one of the values depending upon the hammer velocity V3. The music data code generator 29 calculates time T11 on the basis of the length of the section D12, the hammer velocity V3 and time T5. The music data codes generator 29 decides the key-off event to take place at time T11, and stores it in a music data code.

The hammer assembly 2 is moved on the trajectory shown in FIG. 14 in the case where a pianist simply depresses the front portion of a black/white key 1 from the rest position to the end position and, thereafter releases it. It is rare that the pianist depresses all the black/white keys 1 only simply from the rest positions to the end positions in a performance. In an actual performance, the pianist releases several keys before reaching the rest position, and depresses other keys before reaching the rest position. If the pianist repeats a key 15 times/second or more, the hammer tends to deviate from the trajectory shown in FIG. 14. This is because of the fact that a gap momentarily takes place between the whippen heel and the capstan screw. If the pianist repeatedly depresses the key at irregular time interval, it is hard to reproduce the hammer motion. For this reason, the music data code generator 29 modifies the pieces of music data information so as to make the reproduction of the hammer motion possible. In case where the automatic player piano is fabricated on the basis of an upright piano, the correction is required if the pianist repeats a key 7 times/second or more. However, the electronic tone generator 13 is responsive to the music data codes representative of the high-speed repetition. The music data code generator 29 does not correct the pieces of music data information, and produces the music data codes representative of the actual pieces of music data information.

As will be understood from the foregoing description, the hammer sensors 21 according to the present invention monitor the associated hammer assemblies 2 over the entire trajectories, and supplies the hammer signals representative of the current hammer positions on the trajectories to the data processor 28. The music data code generator 29 extracts the pieces of music data information from the pieces of timing data, and determines the times T1–T5 and the velocity for storing them in the music data codes. Thus, the music data code generator 29 exactly determines the key-on event, note-on event, note-off event and key-of event and the loudness of a tone to be produced.

Especially, the arc pattern 37 is arbitrarily determined. This means that the manufacturer can design the relation between the hammer position and the amount of light incident on the photo receiving port. When the manufacturer designs the relation to be linear, the data processor 28 determines the actual hammer position by using the linear relation, and any approximation is not required. Thus, any error component is never introduced into the pieces of timing data, and the original performance is faithfully reproduced from the music data codes.

The photo-filter plates 70 make the variation of the physical quantity detectable by the photo devices fixedly arranged on virtual lines nearly perpendicular to the plane on which the hammer assemblies 2 are rotated. The distance between the photo-filter plates 70 and the photo devices is not varied. For this reason, it is possible to accommodate the photo devices in a narrow space. In fact, the hammer sensors 21 are covered with the photo-shield covers 97, and are accommodated in the sensor holder 90/95. The photo-shield covers 97 and the sensor holder 90/95 prevent the photo devices from the environmental light. This means that the hammer sensors 21 are free from the noise component. This results in that any noise component is never introduced into the pieces of timing data.

The music data generating subsystem may further include an array of key sensors, which are labeled with reference 21a in FIG. 3. In this instance, the key sensors 21a detect the key-off event, and the time at which the player releases the key is determined on the basis of the signals supplied from the key sensor 21a to the data processor 28. The array of key sensors 21a may work in parallel to the array of hammer sensors 21. In this instance, if the hammer sensor fails to detect the note-on event, the music data code generator 29 decides the time to strike the string 4 on the basis of the signals supplied from the key sensors.

Second Embodiment

Figure 15:
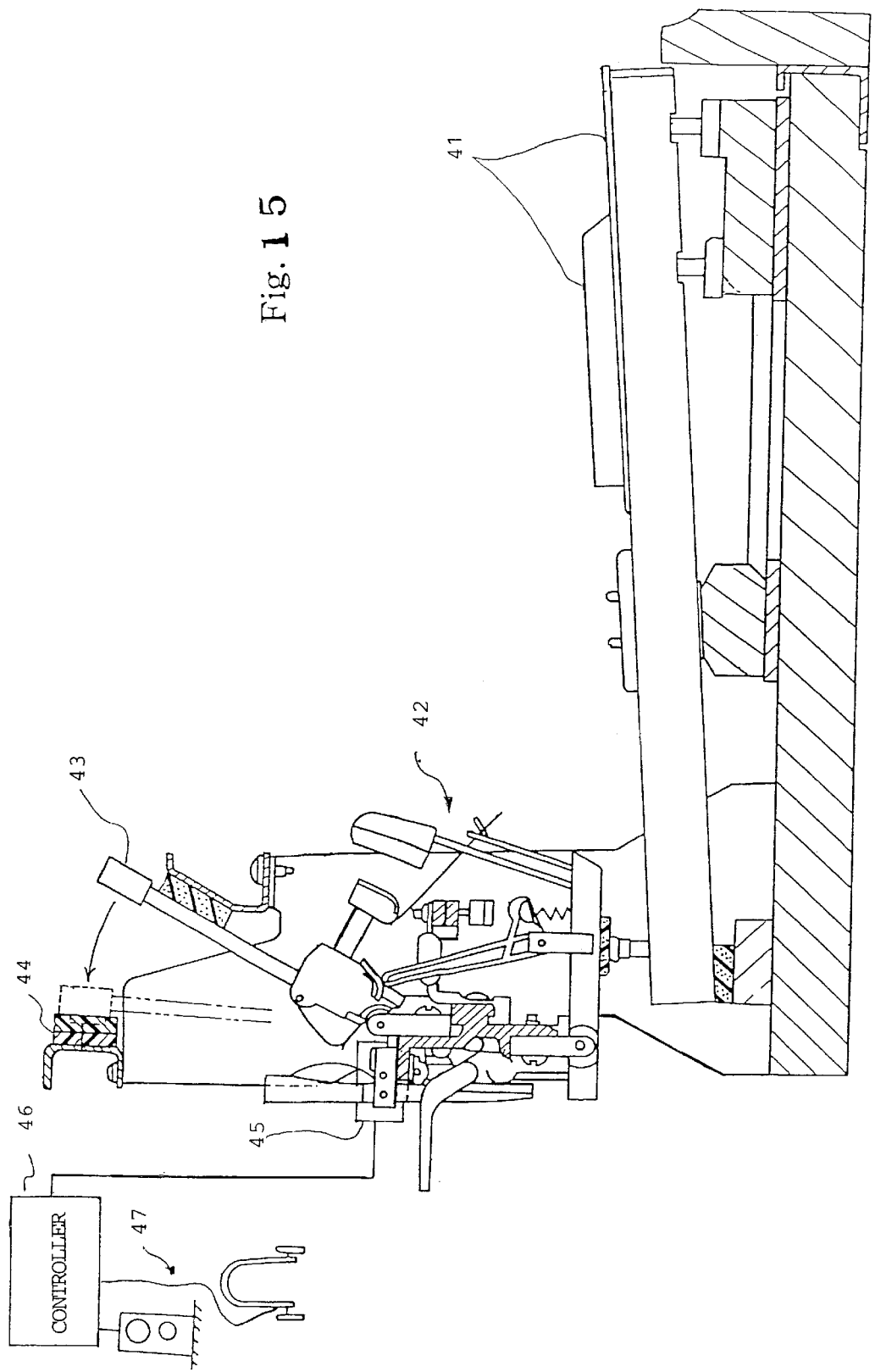
FIG. 15 is a side view showing the structure of a keyboard used for practical use according to the present invention.

Turning to FIG. 15 of the drawings, a keyboard for practical use embodying the present invention is fabricated on the basis of an upright piano. Black/white keys 40 and action mechanisms 41 are similar to those of the upright piano, and hammer assemblies and sets of strings are replaced with dummy hammers 43 and an impact absorber 44. While a trainee is fingering a tune on the black/white keys 41, the action mechanisms 42 are actuated, and the dummy hammers 43 are driven for rotation. The dummy hammers 43 rebound on the impact absorber 44, and any tone is not generated.

The keyboard for practical use further comprises an electronic tone generating system. The electronic tone generating system includes an array of hammer sensors 45, a controller 46 and a sound system 47. The hammer sensors 45 are similar to the hammer sensors 21, and monitor the dummy hammers 43, respectively. The hammer sensors 45 produce hammer position signals representative of the current hammer positions of the dummy hammers 43 on the trajectories, and supply the hammer signals to the controller 46. The controller 46 and the sound system 47 are corresponding to the data processor 28, the music data code generator and the electronic tone generator 13. The controller 46 produces the music data codes, and an audio signal, which is produced from the music data codes, is supplied to the sound system 47 for generating electronic tones.

The hammer sensors 45 have detectable ranges wider than the angle range of the hammer shanks so that the controller 46 produces the music data codes exactly representing the hammer motion. The keyboard achieves other advantages of the automatic player piano.

Third Embodiment

Figure 16:
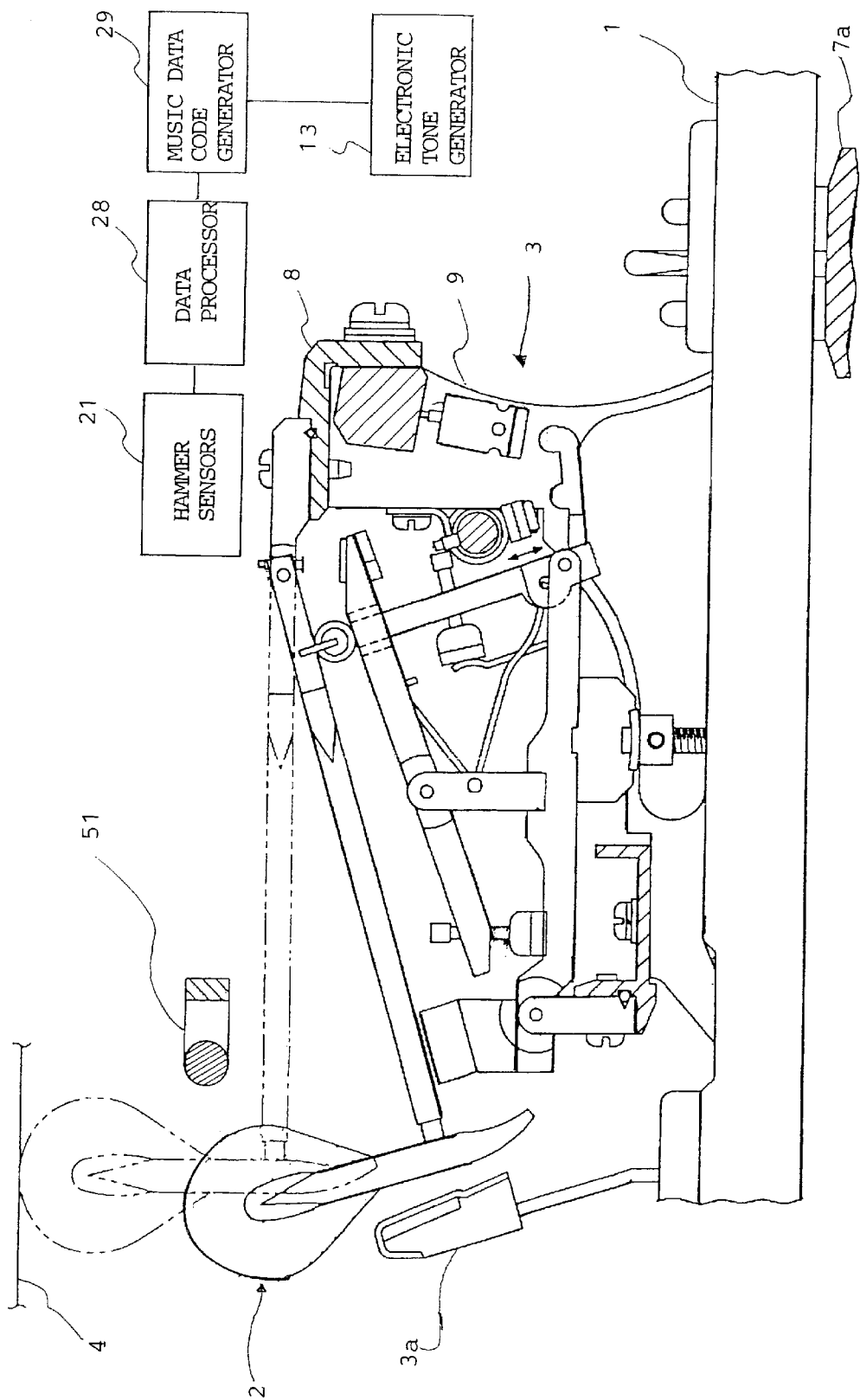
FIG. 16 is a side view showing the structure of a silent piano according to the present invention.

FIG. 16 illustrates a silent piano embodying the present invention. The silent piano is a compromise between an acoustic piano and an electronic tone generating system, and a hammer stopper 51 is provided over the array of hammer assemblies 2. The component parts of the acoustic piano are labeled with the references designating corresponding parts of the automatic player piano, and the electronic tone generating system includes the hammer sensors 21, the data processor 28, the music data code generator 29 and the electronic tone generator 13. These system components 21, 28, 29 and 13 behaves similarly to those of the music data code generating subsystem. For this reason, no further description on the acoustic piano and the electronic tone generating system is incorporated hereinbelow.

The hammer stopper 51 laterally extends over the hammer shanks, and is rotatable between a free position and a blocking position. While the hammer stopper 51 is in the free position as shown in FIG. 16, the hammer assemblies 2 are permitted to strike the associated strings 4, and the vibrating strings 4 generate piano tones. When a user changes the hammer stopper 51 to the blocking position, the hammer stopper 51 is rotated at 90 degrees in clockwise direction, and is moved into the trajectories of the hammer shanks. When the user depresses the black/white keys 1, the action mechanisms 3 are actuated, and drive the associated hammer assemblies 2 for rotation through the escape. However, the hammer shanks rebound on the hammer stopper 51 before striking the strings 4. For this reason, any piano tone is not generated. The hammer sensors 21 monitor the associated hammer assemblies 2, and supply the hammer signals to the data processor 28. The data processor 28 store the pieces of positional data in the memory, and the music data code generator 29 produces the music data codes representative of the pieces of music data information. The electronic tone generator 13 receives the music data codes, and produces the audio signal from the music data codes. The audio signal is supplied to a headphone (not shown) for converting the audio signal to electronic tones.

The silent piano achieves all the advantages of the automatic player piano.

In the first to third embodiments, the photo radiating port 201a, the optical fiber 100 and the combined photo elements 202 as a whole constitute a photo radiating element, and the photo receiving port 201b, the optical fiber 100 and the combined photo elements 202 as a whole constitute a photo receiving element. The photo-filter plate 70 formed with the arc pattern 73 serves as a converter. The shank flange rail 8 is corresponding to a member.

Although particular embodiments of the present invention have been shown and described, it will be apparent to those skilled in the art that various changes and modifications may be made without departing from the spirit and scope of the present invention.

The physical quantity may be the hammer velocity or the acceleration.

The photo-filter plate may be formed of non-transparent material with a slit pattern. The non-transparent material is aluminum, and plural arc slits form in combination the slit pattern. The slit pattern may be formed through an etching. Otherwise, the slit pattern is formed by using a pressing. The photo-filter plate may be implemented by a pair of polarizing plates.

The music data code generator 29 may store negative values for a time period between time T1 and time T10. In this instance, the music data code generator 29 selects one of the negative value depending upon the hammer velocity V1, and adds it to the time T1.

The music data code generator 29 may store a set of values for a time period $\Delta t$ (see FIG. 14) in order to directly estimate time T10/time T11 on the basis of the hammer velocity V1/V3.

Any pattern is employable for the photo-filter plate in so far as the pattern varied the amount of light depending upon the hammer position. A dot pattern, a checker pattern and a line-and-space pattern are examples of the pattern.

The relation between the hammer position and the amount of light may be non-linear. In the above-described embodiment, the transmitted light is incident on the photo receiving port. However, the reflected light may be incident on the photo receiving port.

Figure 17:
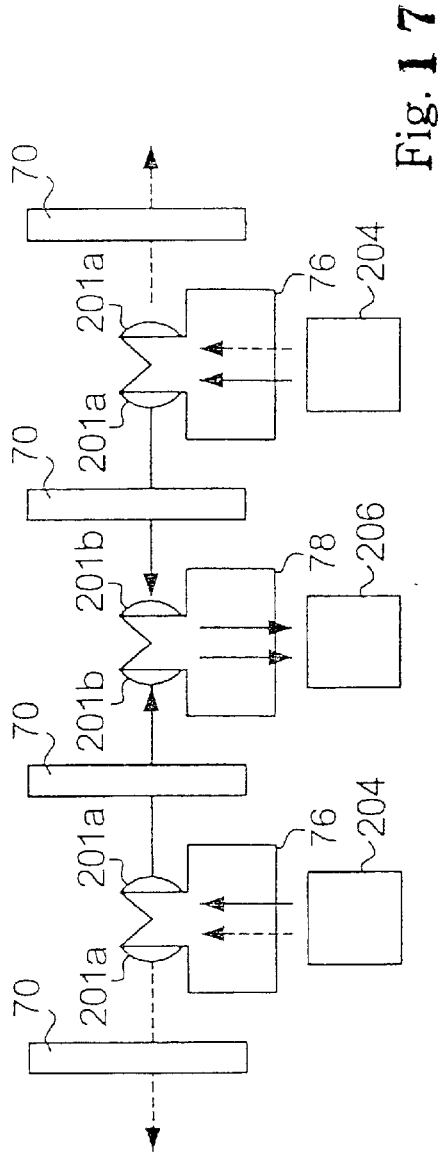
FIG. 17 is a schematic plane view showing the arrangement of another photo elements.

The photo devices may be alternately connected to photo-emitting elements 204 and photo-detecting elements 206 as shown in FIG. 17.

Pairs of photo emitting/photo detecting elements may be provided at the positions assigned to the photo radiating ports 201a and the photo receiving ports 201b.

The hammer sensors 21/45 may detect the associated hammer assemblies at discrete positions on the trajectories.

More than one of the physical quantities such as the hammer position, hammer velocity and hammer acceleration may be detected and/or calculated for analyzing the hammer motion. The hammer velocity may be calculated in more than one section. In this instance, the values of the hammer velocity are averaged so as to eliminate the measurement error from the pieces of timing data.

Of course, the pieces of positional data may be analyzed for another timing data. Some kind of the timing data may be omitted for producing the music data codes. In other words, even though the hammer sensors have the detectable range wider than the angular range of the hammer assemblies, the hammer sensors monitor the associated hammer assemblies in predetermined sections in the trajectories for producing the hammer signals.

What is claimed is:

1. A keyboard musical instrument for producing tones, comprising:

plural keys independently movable between respective rest positions to respective end positions;

plural action mechanisms respectively connected to said plural keys so that moving keys actuate the associated action mechanisms;

plural hammers respectively associated with said plural action mechanisms, and driven for rotation by said associated action mechanisms; and a music data generating system including plural hammer sensors respectively monitoring said plural hammers for detecting a physical quantity of said plural hammers respectively rotatable on virtual planes with respect to a member, each of said plural hammer sensors having a photo radiating element stationary with respect to said member and radiating a light beam along an optical path at least a part of which extends in a direction crossing the virtual plane of the associated hammer, a photo receiving element stationary with respect to said member and provided on said optical path for producing a hammer signal representative of the amount of incident light and a converter rotatable together with said associated hammer and radiated with said light beam for converting a variation of said physical quantity to a variation of said amount of incident light, and a data processing sub-system connected to said plural hammer sensors for receiving the hammer signals and analyzing a hammer motion represented by said variation of said amount of incident light for each of said plural hammers so as to produce an audio signal representative of the tone to be produced through said hammer motion.

2. The keyboard musical instrument as set forth in claim 1, in which said converter includes a base member having a surface moved with respect to said optical path during the rotation of said associated hammer and a pattern different in optical property affecting said amount of incident light from said base member.

3. The keyboard musical instrument as set forth in claim 2, in which said optical property is a transparency to said light beam.

4. The keyboard musical instrument as set forth in claim 2, in which said base member is larger in transparency than said pattern.

5. The keyboard musical instrument as set forth in claim 2, in which said pattern is implemented by plural arcs having a center aligned with an axis of rotation for said associated hammer and varying the ratio between the area of said pattern and the exposed area of said surface together with a rotational angle of said associated hammer.

6. The keyboard musical instrument as set forth in claim 2, in which said pattern makes said hammer signal linearly vary together with a rotational angle of said associated hammer.

7. The keyboard musical instrument as set forth. in claim 1, in which said music data generating system further includes a photo-shield member preventing said hammer sensors from an environmental light.

8. The keyboard musical instrument as set forth in claim 1, further comprising plural sets of strings struck with said plural hammers, respectively, for generating said tones and plural dampers connected to said plural keys, respectively for selectively permitting said plural sets of strings to vibrate after the associated keys are moved.

9. The keyboard musical instrument as set forth in claim 8, in which said plural keys, said plural action mechanisms, said plural hammers, said plural sets of strings and said plural dampers form parts of an acoustic piano.

10. The keyboard musical instrument as set forth in claim 8, further comprising an automatic playing subsystem including plural solenoid-operated actuators respectively moving said plural keys and a data processing unit supplied with music data codes representative of said tone to be produced from said data processing subsystem for energizing the solenoid-operated actuator associated with the set of strings capable of producing said tone.

11. The keyboard musical instrument as set forth in claim 1, further comprising an impact absorber facing said plural hammers so as to be struck with each of said plural hammers at the end of the rotation without producing any tone.

* * * * *